United States Patent
Kitayama et al.

(10) Patent No.: US 10,408,405 B2
(45) Date of Patent: Sep. 10, 2019

(54) LIGHTING APPARATUS ARRANGEMENT FOR SADDLE RIDING VEHICLE, AND SADDLE RIDING VEHICLE

(71) Applicant: HONDA MOTOR CO., LTD., Tokyo (JP)

(72) Inventors: Kyosuke Kitayama, Wako (JP); Tsuyoshi Oguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/899,548

(22) Filed: Feb. 20, 2018

(65) Prior Publication Data

US 2018/0252381 A1  Sep. 6, 2018

(30) Foreign Application Priority Data

Mar. 2, 2017  (JP) ................. 2017-039766

(51) Int. Cl.
*B62J 6/00* (2006.01)
*F21S 41/16* (2018.01)
(Continued)

(52) U.S. Cl.
CPC ............ *F21S 41/16* (2018.01); *B60Q 1/0011* (2013.01); *B60Q 1/0023* (2013.01); *B60Q 1/0035* (2013.01); *B60Q 1/0041* (2013.01); *B60Q 1/0088* (2013.01); *B60Q 1/04* (2013.01); *B60Q 1/12* (2013.01); *B60Q 1/2665* (2013.01); *B62J 6/00* (2013.01); *B62J 6/001* (2013.01); *B62J 6/02* (2013.01); *B62J 6/04* (2013.01);
(Continued)

(58) Field of Classification Search
None
See application file for complete search history.

(56) References Cited

U.S. PATENT DOCUMENTS 5,446,628 A * 8/1995 Blom .................. B60Q 1/0011
362/473
2008/0031002 A1* 2/2008 Venier ....................... B62J 6/04
362/473

(Continued)

FOREIGN PATENT DOCUMENTS

DE   102013008075 A1   11/2014
EP     3015348 A1    5/2016
JP    2013-232405    11/2013

OTHER PUBLICATIONS

European Search Report dated Aug. 2, 2018, 6 pages.
European Office Action dated Mar. 19, 2019, 6 pages.

*Primary Examiner* — Andrew J Coughlin
(74) *Attorney, Agent, or Firm* — Rankin, Hill & Clark LLP

(57) ABSTRACT

To provide a lighting apparatus arrangement for a saddle riding vehicle, allowing a predetermined illumination distance and illumination range of laser light to be easily achieved. A lighting apparatus includes a laser device, a first light guide, and a front-portion light emitting unit. The laser device emits laser light. The first light guide guides light from the laser device to any desired position. The front-portion light emitting unit is disposed at a distal end of the first light guide and irradiates areas around a vehicle with light from the first light guide. The front-portion light emitting unit is disposed at a position higher in level than a lower end of a meter unit disposed at a front portion of a vehicle body.

8 Claims, 16 Drawing Sheets

(51) Int. Cl.

| | |
|---|---|
| *B60Q 1/00* | (2006.01) |
| *B60Q 1/12* | (2006.01) |
| *B62J 6/02* | (2006.01) |
| *B62J 6/04* | (2006.01) |
| *F21S 41/24* | (2018.01) |
| *F21S 43/10* | (2018.01) |
| *F21S 43/251* | (2018.01) |
| *F21S 45/47* | (2018.01) |
| *F21S 43/16* | (2018.01) |
| *F21S 41/176* | (2018.01) |
| *B60Q 1/04* | (2006.01) |
| *B60Q 1/26* | (2006.01) |
| *F21Y 115/30* | (2016.01) |

(52) U.S. Cl.
CPC ............ *F21S 41/176* (2018.01); *F21S 41/24* (2018.01); *F21S 43/10* (2018.01); *F21S 43/16* (2018.01); *F21S 43/251* (2018.01); *F21S 45/47* (2018.01); *B60Q 2300/112* (2013.01); *B60Q 2300/136* (2013.01); *F21Y 2115/30* (2016.08)

(56) References Cited

U.S. PATENT DOCUMENTS

| | | | |
|---|---|---|---|
| 2011/0280039 A1* | 11/2011 | Kishimoto | B60Q 1/0011 362/554 |
| 2013/0027951 A1* | 1/2013 | Takahashi | B60Q 1/085 362/465 |
| 2017/0106929 A1* | 4/2017 | Deckard | B62J 1/00 |

* cited by examiner

LIGHTING APPARATUS ARRANGEMENT FOR SADDLE RIDING VEHICLE, AND SADDLE RIDING VEHICLE

INCORPORATION BY REFERENCE

The present application claims priority under 35 U.S.C. § 119 to Japanese Patent Application No. 2017-039766 filed on Mar. 2, 2017. The content of the application is incorporated herein by reference in its entirety.

TECHNICAL FIELD

The present invention relates to a lighting apparatus arrangement for a saddle riding vehicle and a saddle riding vehicle.

BACKGROUND ART

A lighting apparatus arrangement for a vehicle is conventionally known in which a light emitting unit that emits light as a direction indicator is disposed in each of a front portion, a lateral portion, and a rear portion of the vehicle and a laser device connected by a light guide with each of the light emitting units is disposed inside the vehicle body (see Patent Document 1, for example).

PRIOR ART DOCUMENT

Patent Document

[Patent Document 1]
Japanese Patent Laid-Open No. 2013-232405

SUMMARY OF THE INVENTION

Problem to be Solved by the Invention

The laser device, as disclosed in Patent Document 1, has started to find application in, for example, vehicle headlights because of characteristics of laser light reaching a far distance. The characteristics are not, however, successfully utilized depending on a specific location at vehicle at which the laser device or the light emitting unit to which light is guided from the laser device is disposed in the vehicle, resulting in an insufficient illumination distance and illumination range.

It is an object of the present invention to provide a lighting apparatus arrangement for a saddle riding vehicle, allowing a predetermined illumination distance and illumination range of laser light to be easily achieved.

Means for Solving the Problem

In order to achieve the object, an aspect of the present invention provides a lighting apparatus arrangement for a saddle riding vehicle including a lighting apparatus (10, 100, 120, 210, 300). The lighting apparatus (10, 100, 120, 210, 300) includes: a laser light source (17) that emits light; a light guide (14, 104, 124, 214, 302) that guides light from the laser light source (17) to any desired position; and at least one light emitting unit (12, 122A, 122B, 212A, 212B, 301) that is disposed at a distal end of the light guide (14, 104, 124, 214, 302) and that irradiates areas around the vehicle with light from the light guide (14, 104, 124, 214, 302). In the lighting apparatus arrangement, the light emitting unit (12, 122A, 122B, 212A, 212B, 301) is disposed at a position higher in level than a lower end of a meter unit (72, 193, 272, 355, 356) disposed at a front portion of a vehicle body.

In the above aspect of the present invention, preferably, the light emitting unit (12, 122B, 212B) is incorporated in a rearview mirror (52, 154, 252) disposed at the front portion of the vehicle body.

In the above aspect of the present invention, preferably, the at least one light emitting unit (12, 122A, 122B, 212A, 212B, 301) comprises a pair of light emitting units (12, 122A, 122B, 212A, 212B, 301) disposed on left and right sides.

In the above aspect of the present invention, preferably, the light emitting unit (122B, 212B) is disposed at a base of the rearview mirror (154, 252).

In the above aspect of the present invention, preferably, the light emitting unit (301) is disposed in the meter unit (355, 356).

In the above aspect of the present invention, preferably, a saddle riding vehicle includes another lighting apparatus (71, 354) including an electric bulb or an LED as a light source, in addition to the lighting apparatus (10, 300) for a saddle riding vehicle.

In the above aspect of the present invention, preferably, a saddle riding vehicle includes a camera unit (91) that senses a situation ahead of the vehicle during nighttime traveling, in addition to the lighting apparatus (10, 100, 120, 210, 300) for a saddle riding vehicle.

In the above aspect of the present invention, preferably, the camera unit (91) is capable of magnifying images.

In the above aspect of the present invention, preferably, the camera unit (91) detects visible light.

In the above aspect of the present invention, preferably, the camera unit (91) is disposed in a front cowl (62) or a front cover (181).

In the above aspect of the present invention, preferably, the camera unit (91) is disposed in the rearview mirror (252, 358).

In the above aspect of the present invention, preferably, an illumination direction of the light emitting unit (301) can be changed toward a traveling direction of the vehicle that is estimated using at least a detection signal of a bank angle of a vehicle body, and a lens (91a) of the camera unit (91) can be directed toward the illumination direction.

Advantageous Effects of the Invention

The light emitting unit in the above aspect of the present invention is disposed at a position higher in level than the lower end of the meter unit disposed at a front portion of the vehicle body. Thus, nothing blocks light emitted from the light emitting unit in areas around the vehicle, so that a predetermined illumination distance and illumination range can be easily achieved.

In the above aspect of the present invention, the light emitting unit is incorporated in the rearview mirror disposed at the front portion of the vehicle body. This allows the light emitting unit to be disposed at an even higher position and improve appearance.

In the above aspect of the present invention, the light emitting unit is provided in pairs disposed on the left and right sides. Thus, a degree of freedom in setting the illumination range and illumination distance cab be increased and a predetermined illumination distance and illumination range can be even more readily achieved.

In the above aspect of the present invention, the light emitting unit is disposed at the base of the rearview mirror.

This configuration achieves strength of the rearview mirror, so that the light emitting unit can be readily protected.

In the above aspect of the present invention, the light emitting unit is disposed in the meter unit. The light emitting unit can thus be mounted using existing wires and stays of the meter unit. Reduction in cost can thus be achieved compared with an arrangement requiring new wires and stays.

In the above aspect of the present invention, the saddle riding vehicle includes another lighting apparatus including an electric bulb or an LED as a light source, in addition to the lighting apparatus for a saddle riding vehicle. Thus, a light source of a different type can be used, so that the degree of freedom in setting the illumination distance and the illumination range can be increased.

In the above aspect of the present invention, the saddle riding vehicle includes the camera unit that senses a situation ahead of the vehicle during nighttime traveling, in addition to the lighting apparatus for a saddle riding vehicle. The illumination distance, the illumination direction, and the illumination range of the lighting apparatus can thus be varied depending on the situation ahead of the vehicle.

In the above aspect of the present invention, the camera unit is capable of magnifying images. By enlarging the image, the image of a remote distance to be reached by the laser light can be readily determined.

In the above aspect of the present invention, the camera unit detects visible light. Through a combination with a laser headlight, even the camera unit which may be a low-price visible light camera can sense remote distances.

In the above aspect of the present invention, the camera unit is disposed in the front cowl or the front cover. This facilitates mounting of the camera unit on the front surface of the vehicle body. Additionally, the camera unit can be disposed at a relatively high position in the vehicle body, so that a distant image can be captured.

In addition, in the above aspect of the present invention, the camera unit is disposed in the rearview mirror, the camera unit can be disposed at a high position in the vehicle body, so that an image at an even farther distance can be imaged and enhanced sensing performance can be achieved.

In the above aspect of the present invention, the illumination direction of the light emitting unit can be changed toward a traveling direction of the vehicle that is estimated using at least a detection signal of the bank angle of the vehicle body, and the lens of the camera unit can be directed toward the illumination direction. Thus, the illumination direction of the light emitting unit and the direction toward which the lens is oriented can be adjusted at all times to the traveling direction even when the traveling direction of the vehicle changes, so that accurate sensing by the camera unit can be performed. Thus, the beam can be even more swiftly changed over between the high beam and the low beam.

MODES FOR CARRYING OUT THE INVENTION

Specific embodiments to which the present invention is applied will be described below with reference to the accompanying drawings. Throughout the descriptions given hereunder, longitudinal, lateral, and vertical directions are relative to the vehicle body unless otherwise specified.

First Embodiment

Figure 1:
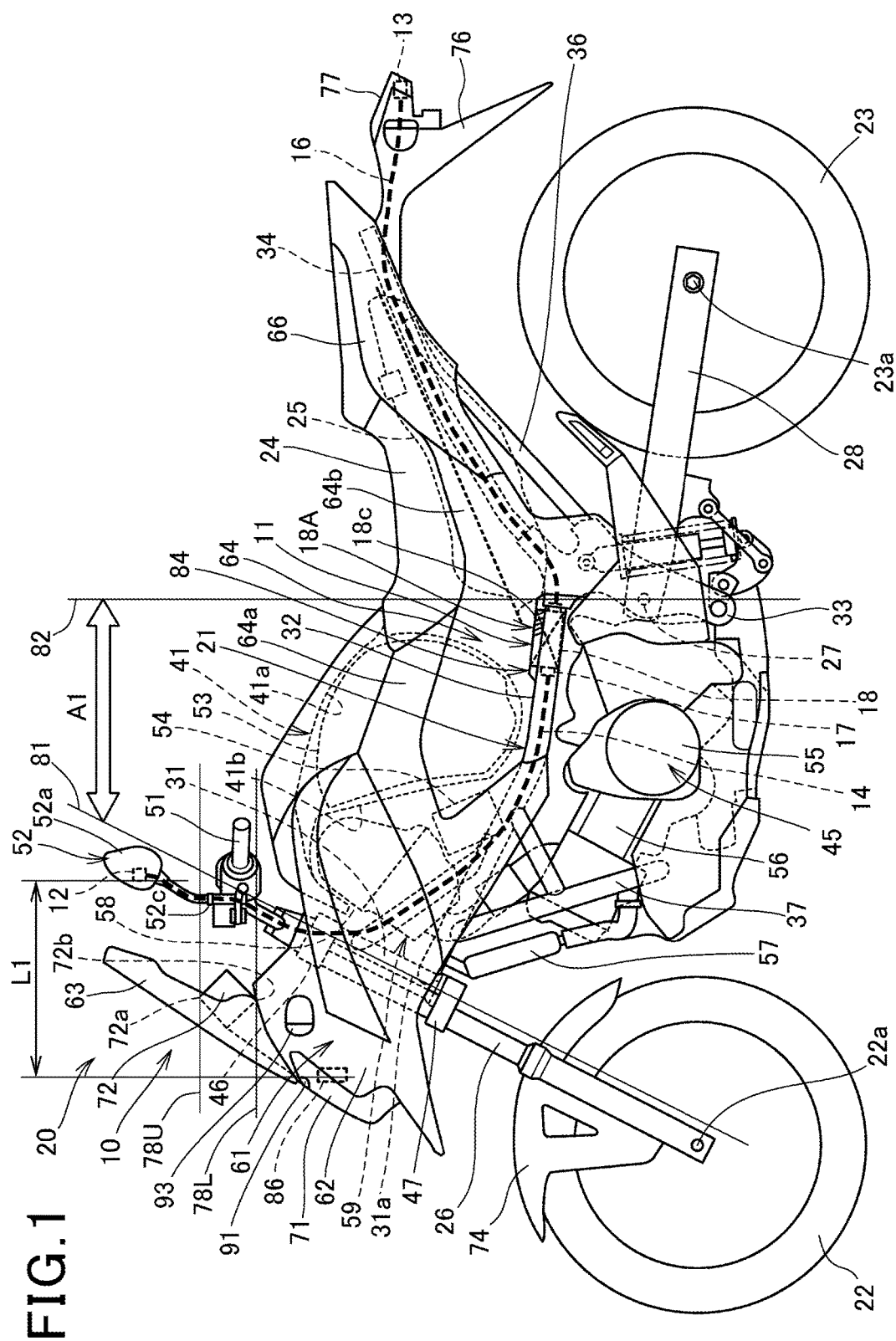
FIG. 1 is a left side elevational view of a motorcycle including a lighting apparatus according to a first embodiment of the present invention.

FIG. 1 is a left side elevational view of a motorcycle 20 including a lighting apparatus 10 according to a first embodiment of the present invention.

The motorcycle 20 is a multi-purpose saddle riding vehicle including a vehicle body frame 21, a front wheel 22, a rear wheel 23, and a seat 24.

The vehicle body frame 21 includes a head pipe 31, a pair of left and right main frames 32, a pair of left and right pivot frames 33, a pair of left and right seat frames 34, a pair of left and right sub-frames 36, and a pair of left and right down frames 37.

The head pipe 31 constitutes a front end portion of the vehicle body frame 21. The head pipe 31 steerably supports a front fork 26 that supports the front wheel 22. The main frames 32 extend from the head pipe 31 obliquely downwardly toward the rear. The main frames 32 support a front-portion storage box 41. The pivot frames 33 extend downwardly from rear end portions of the main frames 32. The pivot frames 33 support a pivot shaft 27 that extends in a vehicle width direction. The seat frames 34 extend from rear end portions of the main frames 32 obliquely upwardly toward the rear. The seat frames 34 support the seat 24 and a fuel tank 25. The sub-frames 36 connect the pivot frames 33 with rear ends of the seat frames 34. The down frames 37 extend from front end portions of the main frames 32 obliquely downwardly toward the rear. The down frames 37 cooperate with the pivot frames 33 to support an engine 45.

The front fork 26 includes a top bridge 46 and a bottom bridge 47 that each laterally connect the front fork 26. A handlebar 51 is mounted on an upper surface of the top bridge 46. The front wheel 22 is supported at a lower end portion of the front fork 26 via an axle 22a. A pair of left and right rearview mirrors 52 is mounted on the handlebar 51.

A swing arm 28 is swingably mounted on the pivot shaft 27. The rear wheel 23 is supported at a rear end portion of the swing arm 28 via an axle 23a.

The front-portion storage box 41 is disposed at a position at which a fuel tank has traditionally been disposed. A helmet 53 is housed in a large-sized storage chamber 41a. A recess 41b that is recessed superiorly is formed in front of the storage chamber 41a in the front-portion storage box 41. A battery 54 is disposed inside the recess 41b.

The engine 45 includes a crankcase 55 and a cylinder portion 56. The cylinder portion 56 extends from a front portion of the crankcase 55 obliquely upwardly toward the front. A radiator 57 is disposed at a position obliquely superior to, and anterior to, the cylinder portion 56. The radiator 57 cools the engine 45 by water. An intake system 59 including an air cleaner 58 is connected with an upper portion of the cylinder portion 56.

The vehicle body frame 21 is covered with a vehicle body cover 61.

The vehicle body cover 61 includes a front cowl 62, a windscreen 63, a side cover 64, and a rear cover 66.

The front cowl 62 covers front and sides of the head pipe 31 and the front fork 26, and sides of the front-portion storage box 41. A headlight 71 is disposed inside the front cowl 62. The windscreen 63 is mounted on an upper end portion of the front cowl 62. A meter unit 72 is disposed on an upper portion of the front cowl 62 at a position posterior to the windscreen 63. The side cover 64 includes a front side cover 64a and a rear side cover 64b. The side cover 64 covers sides of the front-portion storage box 41 and a lower portion of the seat 24. The rear cover 66 covers the lower portion of the seat 24.

The front wheel 22 is covered with a front fender 74 from above. The rear wheel 23 is covered in a rear fender 76 from above. A taillight 77 is mounted at a rear end portion of the rear fender 76.

The lighting apparatus 10 includes a light source unit 11, a front-portion light emitting unit 12, a rear-portion light emitting unit 13, a first light guide 14, and a second light guide 16.

The light source unit 11 is disposed on an inner lateral side of each of the left and right main frames 32. The light source unit 11 includes a laser device 17 and a driver unit 18.

The laser device 17 assumes a high-beam lighting auxiliary light source that has been added for supplementarily assisting the headlight 71, or more specifically, a high-beam light source provided for the headlight 71. The driver unit 18 causes the laser device 17 to emit laser light. The driver unit 18 includes a heat sink 18A that cools the laser device 17. The laser device 17 is mounted on the heat sink 18A. The heat sink 18A is provided with a plurality of cooling fins 18c that promote cooling by air flow.

The front-portion light emitting unit 12 is disposed in the rearview mirror 52, or more specifically, a rearview mirror main body 52a that constitutes an upper portion of the rearview mirror 52. As a result, the front-portion light emitting unit 12 is disposed on a level identical to a level of the meter unit 72 or superior to the meter unit 72. For an easier understanding of the level of the front-portion light emitting unit 12, FIG. 1 depicts a horizontal auxiliary line 78U and a horizontal auxiliary line 78L. The auxiliary line 78U passes through an upper end 72a of the meter unit 72. The auxiliary line 78L passes through a lower end 72b of the meter unit 72. The front-portion light emitting unit 12 is disposed superior to the lower auxiliary line 78L and, preferably, disposed superior to the upper auxiliary line 78U. The disposition of the front-portion light emitting unit 12 at a high level of the vehicle body as described above allows an illumination distance and an illumination range of laser light to be emitted from the front-portion light emitting unit 12 to be achieved.

The front-portion light emitting unit 12 may include at least either one of a lens that refracts the emitted laser light and a reflector that reflects the emitted laser light. The lens and the reflector distribute the emitted laser light to a predetermined range ahead of the vehicle. The lens and the reflector may even be provided in a light emitting unit according to another embodiment.

The rear-portion light emitting unit 13 is disposed inside the taillight 77 and assumes a light source for a brake light and a position light.

The first light guide 14 and the second light guide 16 are each formed of an optical fiber that can be freely bent to suit the shape of a position inside the vehicle body, at which the first light guide 14 and the second light guide 16 are routed.

The light source unit 11 is disposed, in a vehicle fore-aft direction, in a zone A1 between the head pipe 31 and the pivot shaft 27 (specifically, between a straight line 81 that overlaps an axis 31a passing through the head pipe 31 and a vertical line 82 that passes through a center of the pivot shaft 27). The light source unit 11 may overlap the head pipe 31 or the pivot shaft 27 in a side view. The axis 31a of the head pipe 31 serves as a steering axis of the front wheel 22. More specifically, the axis 31a of the head pipe 31 assumes a steering axis of the front fork 26 by which the front wheel 22 is supported, so that the front wheel 22 is steered about the axis 31a.

The disposition of the light source unit 11 in the zone A1 as described above allows the light source unit 11 that has a relatively heavy weight to be disposed near a center of gravity of the vehicle, so that mass can be centralized on the side of the center of gravity of the vehicle body. As a result, running performance including vehicle turning performance can be enhanced.

Additionally, the light source unit 11 is disposed between the engine 45 and the fuel tank 25. This arrangement also promotes centralization of mass on the side of the center of gravity of the vehicle body.

Additionally, the heat sink 18A (specifically, the plurality of cooling fins 18c) of the light source unit 11 is exposed to the outside from a clearance 84 provided between the main frame 32 and the side cover 64 (specifically, the rear side cover 64b). The cooling fins 18c each have a distal end disposed to be flush with or inside (or outside) in the vehicle width direction a plane connecting an outer lateral surface of the main frame 32 and an outer lateral surface of the side cover 64.

Although the light source unit 11 can be cooled by the heat sink 18A, a coolant pipe extending from the cylinder portion 56 or the radiator 57 disposed around the light source unit 11 may be connected with the light source unit 11. This arrangement allows the light source unit 11 to be cooled by the coolant cooled by the radiator 57.

The headlight 71 includes a headlight light source 86 including an electric bulb or an LED. The headlight light source 86 includes a low-beam light source and a high-beam light source.

The lighting apparatus 10 described above constitutes a headlight apparatus that supplementarily assists the high-beam light source of the headlight 71, specifically, an auxiliary headlight. It is noted that the headlight light source 86 of the headlight 71 may nonetheless constitute only the low-beam light source. In this case, the lighting apparatus 10 is a headlight apparatus having a function of only the high-beam light source of the headlight 71.

One type of the motorcycle 20 is a naked type in which the front fork 26, the head pipe 31, the main frames 32, and other parts are not covered with the front cowl or the side cover. In the naked type, too, the light source unit 11 is, for example, disposed between the head pipe 31 and the pivot shaft 27, and between the engine 45 and the fuel tank 25 supported on the main frames 32.

A camera unit 91 is disposed superior to the headlight 71 on the front cowl 62. The camera unit 91 images a situation ahead of the vehicle during nighttime traveling.

The camera unit 91 includes a lens, an imaging device, an image processor, a recorder, and a zoom mechanism (including a telescope). The camera unit 91 detects visible light. During nighttime traveling, the camera unit 91 images a pedestrian, a preceding vehicle, and an oncoming vehicle ahead of the vehicle and the image processor performs an image recognition process for the image captured by the camera unit 91 to thereby recognize the situation ahead of the vehicle. This enables the high beam and the low beam of the lighting apparatus 10 and the headlight 71 to be changed over automatically. The foregoing arrangement improves distance visibility at night through the use of the high beam and reduces load on changing over the beams. Additionally, changing over to the low beam can prevent dazzle.

Additionally, a predetermined distance or greater can be achieved for a distance L1 in the vehicle fore-aft direction between the front-portion light emitting unit 12 and the camera unit 91. Thus, heat generated in the front-portion light emitting unit 12 can be prevented from affecting the camera unit 91 (thermal interference).

Figure 2:
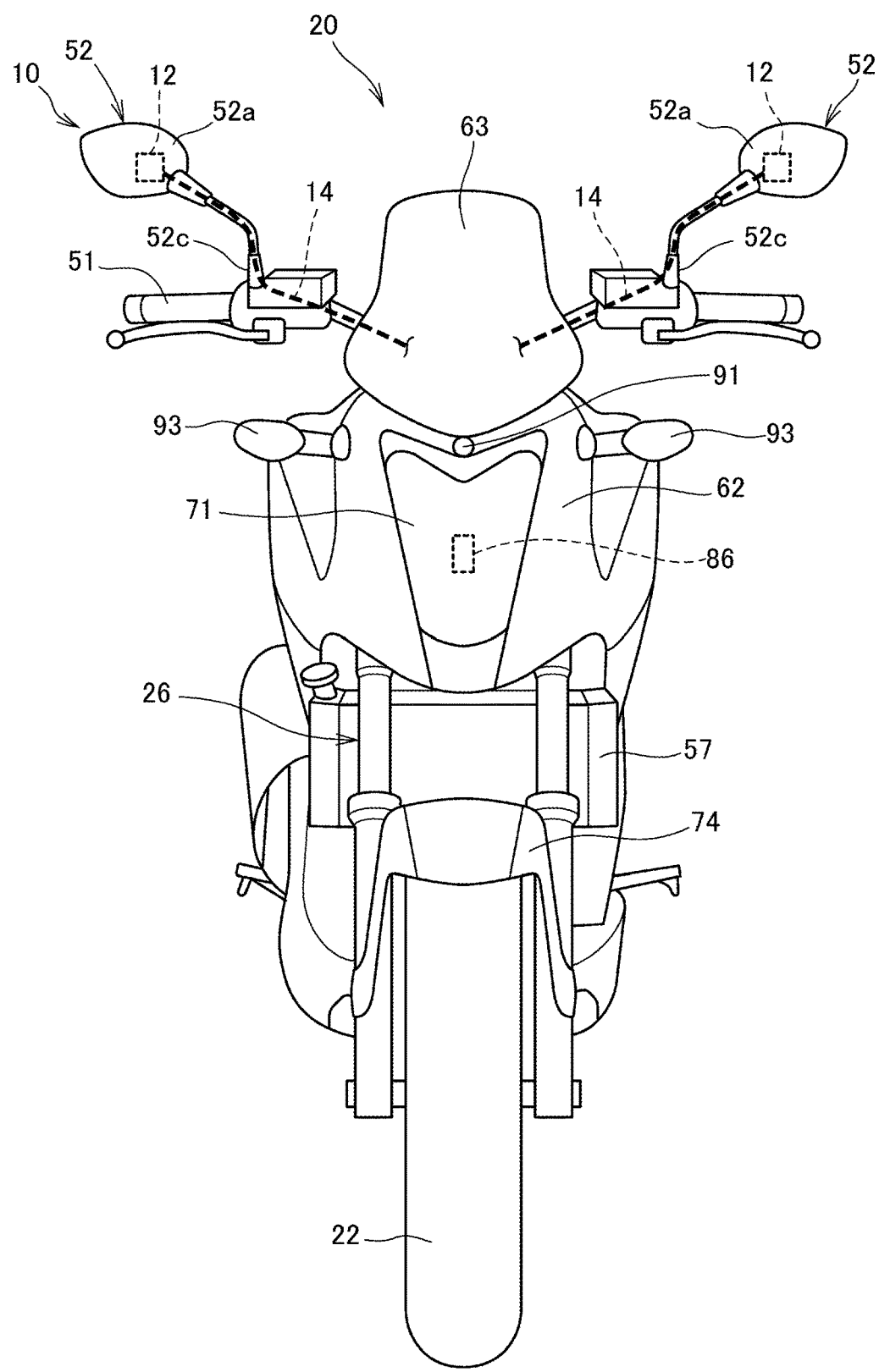
FIG. 2 is a front elevational view of the motorcycle depicting part of the lighting apparatus (first embodiment).
Figure 3:
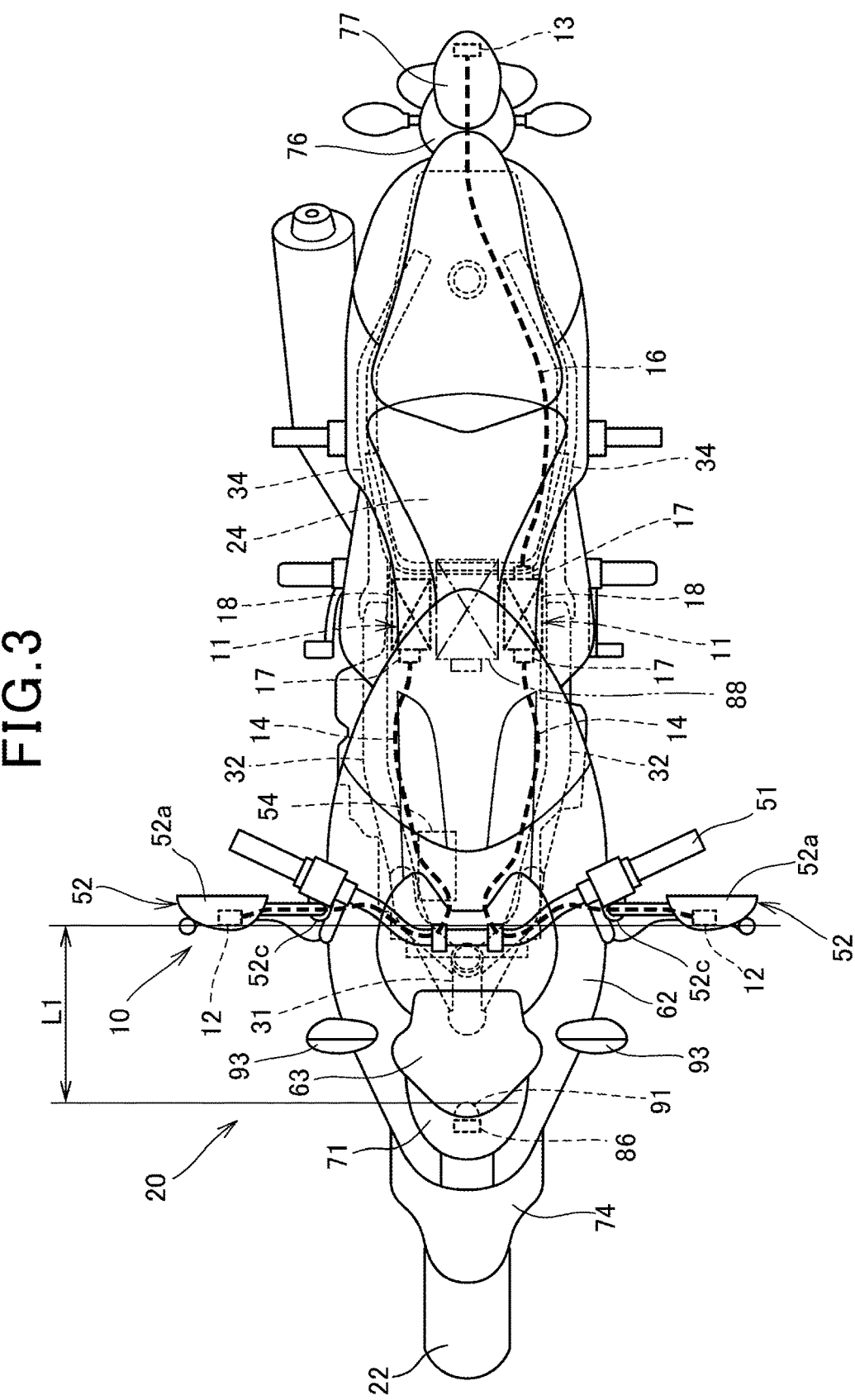
FIG. 3 is a plan view of the motorcycle depicting the lighting apparatus (first embodiment).

FIG. 2 is a front elevational view of the motorcycle 20 depicting part of the lighting apparatus 10. FIG. 3 is a plan view of the motorcycle 20 depicting the lighting apparatus 10.

As depicted in FIGS. 2 and 3 (see FIG. 1 also), the light source unit 11 is provided in pairs inside the left and right main frames 32 in the vehicle width direction. The first light guides 14 extend from the respective laser devices 17 toward the front along inner lateral surfaces of the respective main frames 32 and bend upwardly at positions posterior to the head pipe 31. The first light guides 14 further extend from the top bridge 46 (see FIG. 1) of the front fork 26 to the outside in the vehicle width direction along the handlebar 51. The first light guides 14 then bend upwardly from bases of the respective rearview mirrors 52 and are connected with the respective front-portion light emitting units 12 disposed at the respective rearview mirror main bodies 52a.

The front-portion light emitting units 12 are disposed at a high level of the vehicle in a vehicle front elevational view. Thus, nothing blocks the laser light emitted to the front of the vehicle from the front-portion light emitting units 12 and the rearview mirrors 52 are suitable for the positions at which the front-portion light emitting units 12 are to be disposed.

The second light guide 16 extends from the laser device 17 of the light source unit 11 on one side toward the rear along the seat frame 34 on a second side (left side). The second light guide 16 further extends from a rear end portion of the seat frame 34 toward the rear along the rear fender 76 and is connected with the rear-portion light emitting unit 13 of the taillight 77.

In the first embodiment, the light source unit 11 is provided in pairs on the left and right sides. As a modification, a single light source unit 88 indicated by the imaginary line in FIG. 3 may be disposed at a central portion in the vehicle width direction between the left and right main frames 32.

The arrangement in which the front-portion light emitting units 12 are disposed in the rearview mirror main bodies 52a of the rearview mirrors 52 is illustrative only and not limiting. The front-portion light emitting units 12 may be disposed at base portions 52c at the bases of the rearview mirrors 52. The base portions 52c of the rearview mirrors 52 are disposed on a level identical to a level on which the meter unit 72 (see FIG. 1) is disposed.

Alternatively, the front-portion light emitting units 12 may be disposed at a base portion of the windscreen 63.

In FIG. 3, the battery 54 is disposed at a position closer to the main frame 32 on a first side (specifically, the right side) between the left and right main frames 32.

The camera unit 91 is disposed, in the front cowl 62, superior to the headlight 71 and inferior to the windscreen 63. The camera unit 91 is disposed on a level identical to a level on which a pair of left and right front direction indicators 93 is disposed. The disposition of the camera unit 91 at a position that is relatively high in level in the vehicle body as described above enables imaging of a remoter distance ahead of the vehicle, so that the pedestrian, the preceding vehicle, and the oncoming vehicle can be more readily recognized.

As depicted in FIGS. 1 to 3, the lighting apparatus 10 of the motorcycle 20 as a saddle riding vehicle includes the laser device 17 as a laser light source, the first light guide 14 as a light guide, and the front-portion light emitting unit 12 as a light emitting unit.

The laser device 17 emits laser light. The first light guide 14 guides light from the laser device 17 to any desired position. The front-portion light emitting unit 12 is disposed at a distal end of the first light guide 14 and emits light from the first light guide 14 to illuminate an area around the vehicle.

The front-portion light emitting unit 12 is disposed in a side view at a position higher in level than the meter unit 72 disposed at the front portion of the vehicle body. This arrangement involves nothing to block the light emitted from the front-portion light emitting unit 12 in areas around the vehicle, so that a predetermined illumination distance and a predetermined illumination range can be easily achieved.

Additionally, the front-portion light emitting unit 12 is built into the rearview mirror 52 disposed at the front portion of the vehicle body. This arrangement allows the front-portion light emitting unit 12 to be disposed at even a higher level and appearance to be improved.

The front-portion light emitting unit 12 is provided in pairs on the left and right sides. This arrangement allows a degree of freedom in setting the illumination range and the illumination distance to be increased and a predetermined illumination distance and a predetermined illumination range can be even more readily achieved.

In addition, the motorcycle 20 includes the lighting apparatus 10 and the headlight 71 as another lighting apparatus including an electric bulb or an LED as a light source. This arrangement enables use of a light source of a different type and allows the degree of freedom in setting the illumination distance and the illumination range to be increased.

As depicted in FIG. 2, the motorcycle 20 as a saddle riding vehicle includes, in addition to the lighting apparatus 10, the camera unit 91 that senses the situation ahead of the vehicle during nighttime traveling. This arrangement allows the illumination distance, the illumination direction, and the illumination range of the lighting apparatus 10 to be varied depending on the situation ahead of the vehicle.

Additionally, the camera unit 91 is capable of magnifying images of distant objects, so that a remote image to be reached by the laser light can be more easily determined through magnification.

Additionally, the camera unit 91 detects visible light. Through a combination with the headlight apparatus that emits laser light, even the camera unit 91 which may be a relatively low-price visible light camera can sense remote distances.

Second Embodiment

Figure 4:
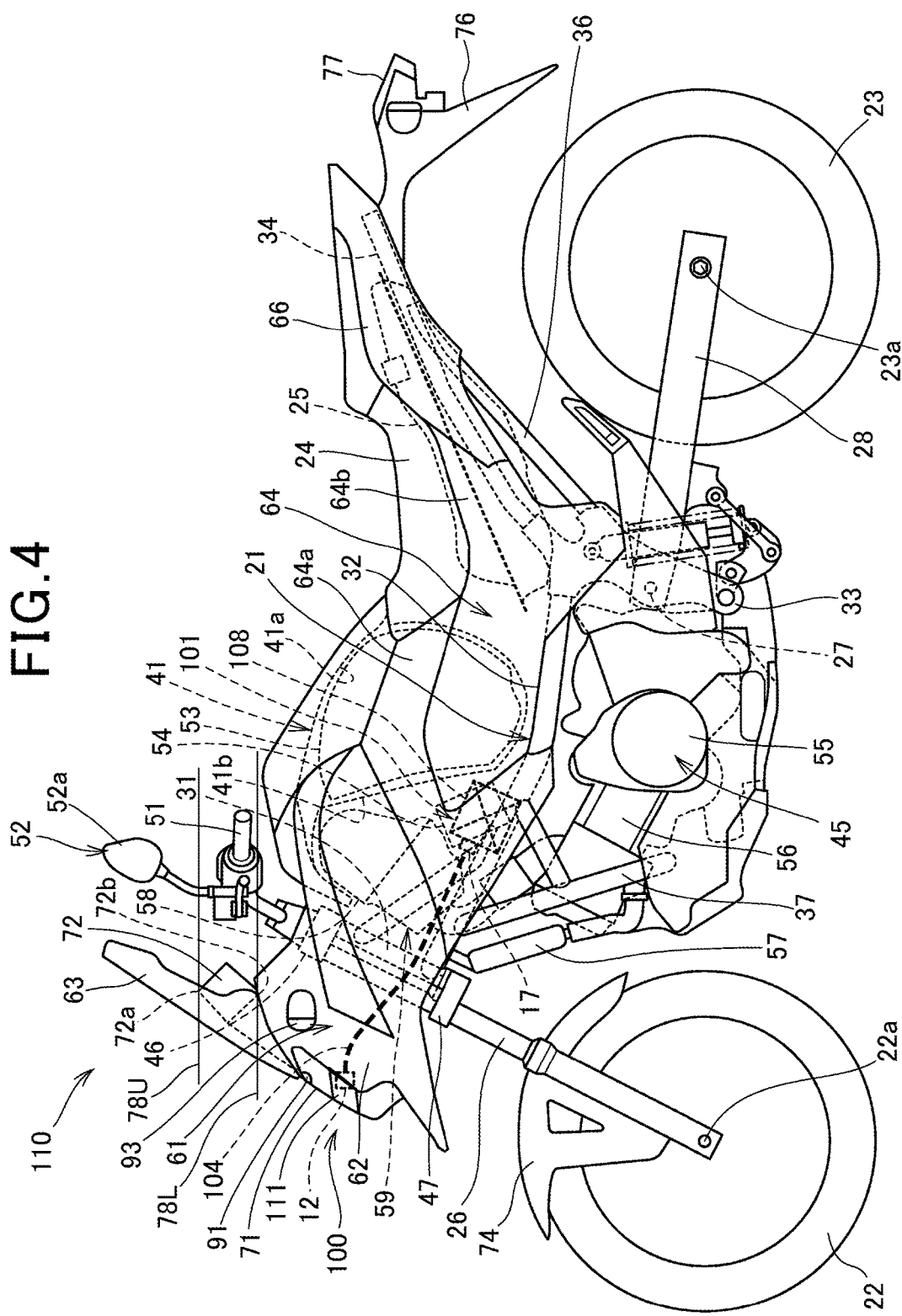
FIG. 4 is a left side elevational view of a motorcycle including a lighting apparatus according to a second embodiment of the present invention.
Figure 5:
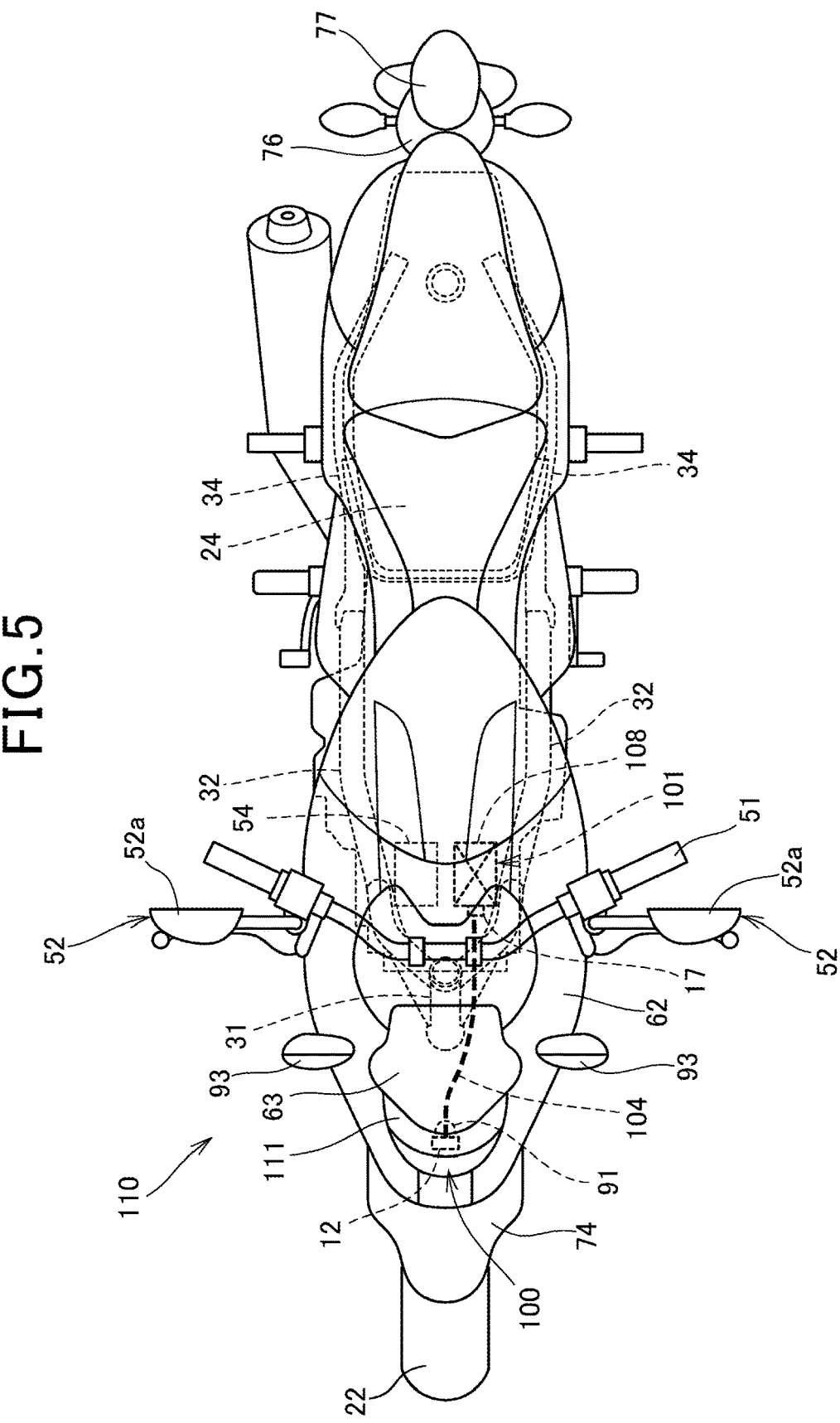
FIG. 5 is a plan view of the motorcycle depicting the lighting apparatus (second embodiment).

FIG. 4 is a left side elevational view of a motorcycle 110 including a lighting apparatus 100 according to a second embodiment of the present invention. FIG. 5 is a plan view of the motorcycle 110 depicting the lighting apparatus 100.

As depicted in FIGS. 4 and 5, the motorcycle 110 differs from the lighting apparatus 10 (see FIG. 1) of the motorcycle 20 (see FIG. 1) in the first embodiment only in the lighting apparatus 100.

The lighting apparatus 100 constitutes a headlight apparatus and includes a light source unit 101, a front-portion light emitting unit 12, and a light guide 104. The light source unit 101 is disposed between left and right main frames 32. The front-portion light emitting unit 12 assumes a light source for a headlight 111 disposed inside a front cowl 62. The light guide 104 connects the light source unit 101 with the front-portion light emitting unit 12.

The light source unit 101 includes a laser device 17 and a driver unit 108 that causes the laser device 17 to emit laser light. The light source unit 101 is disposed at a position between the left and right main frames 32 and closer to the main frame 32 on a second side (specifically, the left side). Additionally, the light source unit 101 is disposed in a recess 41b disposed anterior to a storage chamber 41a in a front-portion storage box 41 and beside a battery 54.

The front-portion light emitting unit 12 assumes a high-beam light source in the headlight 111 and constitutes a headlight light source together with a low-beam light source not depicted and disposed inside the headlight 111.

The light guide 104 extends from the light source unit 101 toward the front along the main frame 32 on the second side (left side). The light guide 104 passes along a head pipe 31 to extend further toward the front inside the front cowl 62 and be connected to the front-portion light emitting unit 12 in the headlight 111.

The front-portion light emitting unit 12 may be configured as a headlight light source including the low-beam light source and the high-beam light source of the headlight 111. In this case, two light guides for the low-beam light source and the high-beam light source may extend from the light source unit 101 to the front-portion light emitting unit 12.

The light source unit 101 is disposed, in the vehicle fore-aft direction, between the head pipe 31 and a pivot shaft 27. The light source unit 101 is disposed between an engine 45 and the front-portion storage box 41.

A vehicle body space can be effectively utilized by disposing the light source unit 101 in the recess 41b at a lower portion of the front-portion storage box 41, so that a front portion of the vehicle body can be built small and compactly.

A camera unit 91 is disposed superior to a headlight 71 and inferior to a windscreen 63 in the front cowl 62. The camera unit 91 is disposed on a level identical to a level on which a pair of left and right front direction indicators 93 is disposed.

During nighttime traveling, the camera unit 91 images a pedestrian, a preceding vehicle, and an oncoming vehicle ahead of the vehicle and an image processor performs an image recognition process for the image captured by the camera unit 91 to thereby enable the high beam and the low beam of the lighting apparatus 100 to be changed over automatically.

Third Embodiment

Figure 6:
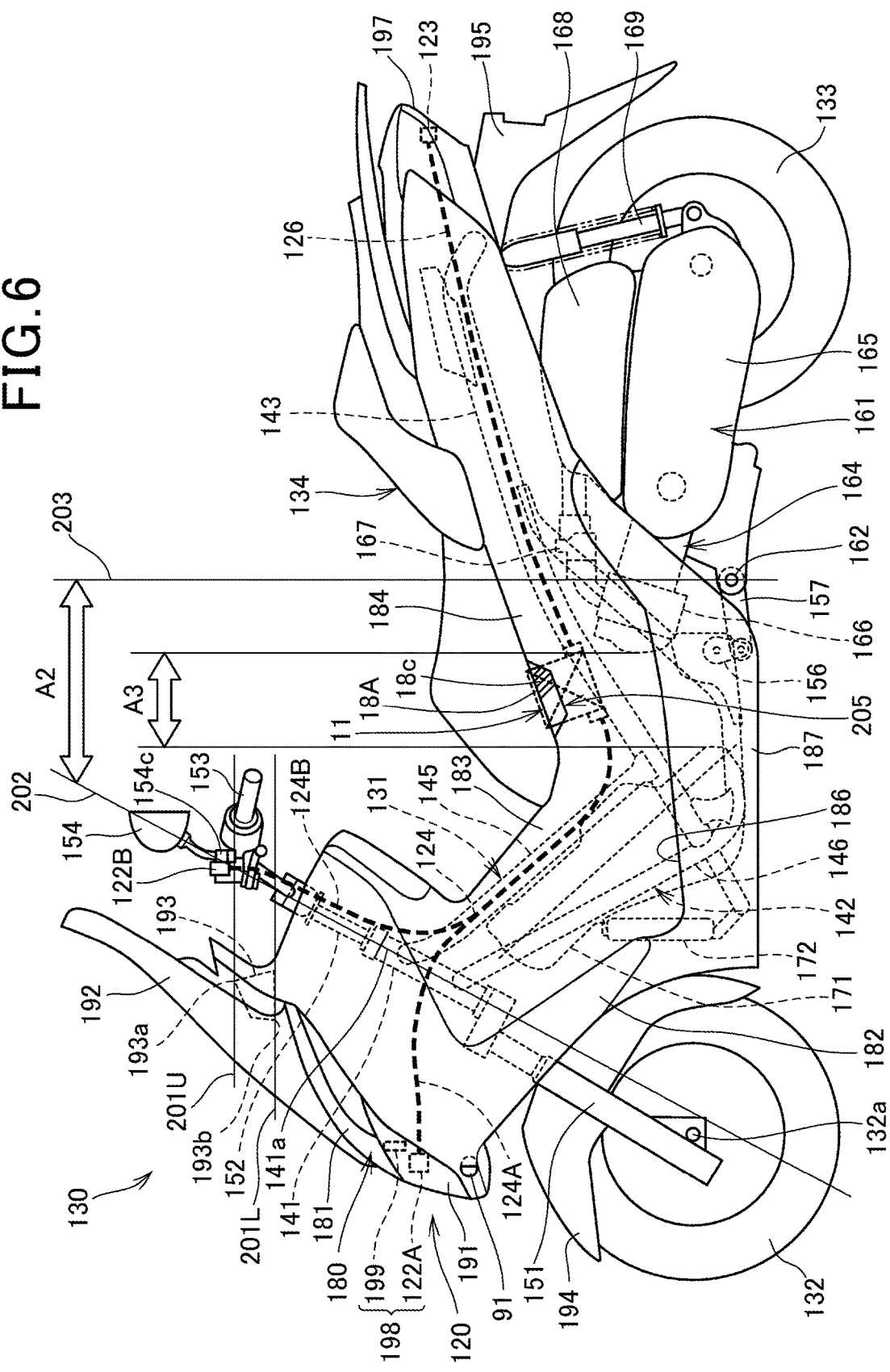
FIG. 6 is a left side elevational view of a motorcycle including a lighting apparatus according to a third embodiment of the present invention.

FIG. 6 is a left side elevational view of a motorcycle 130 including a lighting apparatus 120 according to a third embodiment of the present invention.

The motorcycle 130 is a scooter saddle riding vehicle including a vehicle body frame 131, a front wheel 132, a rear wheel 133, and a seat 134.

The vehicle body frame 131 includes a head pipe 141, a down frame 142, and a pair of left and right rear frames 143. The head pipe 141 constitutes a front end portion. The down frame 142 extends from the head pipe 141 obliquely downwardly toward the rear. The rear frames 143 are connected with lower portions of the down frame 142 and extend obliquely upwardly toward the rear.

The down frame 142 includes a pair of left and right upper down frames 145 and a pair of left and right lower down frames 146. The upper down frames 145 extend from an upper portion of the head pipe 141 obliquely downwardly toward the rear. The lower down frames 146 extend from a lower portion of the head pipe 141 obliquely downwardly toward the rear below the upper down frames 145.

The rear frames 143 have front ends connected with the lower down frames 146 and middle portions connected with lower ends of the upper down frames 145.

The lower down frames 146 extend from connections with the rear frames 143 toward the rear. The lower down frames 146 bend obliquely upwardly and extend rearwardly before being connected with rear portions of the rear frames 143.

The head pipe 141 steerably supports a front fork 151. The front fork 151 includes a steering stem 152 disposed at an upper portion of the front fork 151. The steering stem 152 is steerably inserted in the head pipe 141. A handlebar 153 is mounted on an upper end portion of the steering stem 152. A pair of left and right rearview mirrors 154 is mounted on the handlebar 153.

The front fork 151 supports, at a lower end portion thereof, the front wheel 132 via an axle 132a.

A linkage 156 is mounted on lower portions of the lower down frames 146 so as to be oscillatable in the fore-aft direction. A power unit 161 is connected with a lower end portion of the linkage 156 via an arm 157. A pivot shaft 162 is disposed in the arm 157. The power unit 161 is oscillatably supported on the pivot shaft 162.

The power unit 161 includes an engine 164 and a continuously variable transmission 165. The engine 164 constitutes a front portion of the power unit 161. The continuously variable transmission 165 extends from one lateral portion of the engine 164 toward the rear.

The engine 164 includes a cylinder portion 166 that extends in the fore-aft direction. An intake system 167 is connected with an upper portion of the cylinder portion 166. An air cleaner 168 that constitutes the intake system 167 is mounted on an upper portion of the continuously variable transmission 165. A rear cushion unit 169 is disposed across a rear end portion of the continuously variable transmission 165 and a rear end portion of the vehicle body frame 131.

A fuel tank 171 is disposed between the left and right down frames 142 under a condition in which the fuel tank 171 extends obliquely upwardly toward the front. A radiator 172 supported on the vehicle body frame 131 is disposed anterior to the fuel tank 171.

The vehicle body frame 131 is covered with a vehicle body cover 180.

The vehicle body cover 180 includes a front cover 181, a pair of left and right leg shields 182, a center cover 183, a pair of left and right body covers 184, a pair of left and right floor steps 186, and a pair of left and right under covers 187.

The front cover 181 covers an area anterior to the front fork 151. The leg shields 182 are connected with both lateral side portions of the front cover 181 to thereby cover legs of a rider from the front. The center cover 183 is disposed between the left and right leg shields 182 to thereby cover an area posterior to the front fork 151. The body covers 184 extend from a rear end of the center cover 183 toward the rear to thereby laterally cover the vehicle body. The floor steps 186 extend from lower ends of the leg shields 182 toward the rear. The rider can rest his or her feet on the floor steps 186. The under covers 187 cover areas inferior to the floor steps 186.

A headlight 191 is disposed inside the front cover 181. A windscreen 192 is mounted above the front cover 181. A meter unit 193 is disposed in the front cover 181 at a position posterior to the windscreen 192.

A front fender 194 covers the front wheel 132 from above. A rear fender 195 covers the rear wheel 133 from above. A rear combination light 197 is disposed superior to the rear fender 195.

The lighting apparatus 120 includes a light source unit 11, an in-light front-portion light emitting unit 122A, a front-portion upper-portion light emitting unit 122B, a rear-portion light emitting unit 123, a first light guide 124, a second light guide 126, and the headlight 191. The headlight 191 forms part of the lighting apparatus 120.

The light source unit 11 is disposed on a lateral inside of each of the left and right rear frames 143.

The in-light front-portion light emitting unit 122A assumes a high-beam light source for the headlight 191. The headlight 191 includes a headlight light source 198. The headlight light source 198 includes a low-beam light source 199 provided for the headlight 191 and the in-light front-portion light emitting unit 122A.

The front-portion upper-portion light emitting unit 122B functions as a high-beam light source added for supplementarily assisting the in-light front-portion light emitting unit 122A of the headlight 191. The front-portion upper-portion light emitting unit 122B is disposed at the rearview mirror 154, specifically, a base portion 154c at the base of the rearview mirror 154. As a result, the front-portion upper-portion light emitting unit 122B is disposed on a level identical to a level on which the meter unit 193 is disposed or superior to the meter unit 193. For an easier understanding of the level of the front-portion upper-portion light emitting unit 122B, FIG. 6 depicts a horizontal auxiliary line 201U and a horizontal auxiliary line 201L. The auxiliary line 201U passes through an upper end 193a of the meter unit 193. The auxiliary line 201L passes through a lower end 193b of the meter unit 193. The front-portion upper-portion light emitting unit 122B is disposed superior to the lower auxiliary line 201L and, preferably, disposed superior to the upper auxiliary line 201U. The disposition of the front-portion upper-portion light emitting unit 122B at a high level of the vehicle body as described above allows an illumination distance and an illumination range of laser light to be emitted from the front-portion upper-portion light emitting unit 122B to be achieved.

The in-light front-portion light emitting unit 122A and the front-portion upper-portion light emitting unit 122B disposed at a position higher in level than the in-light front-portion light emitting unit 122A are both provided as the high-beam light source as described above. This arrangement allows the illumination range to be widened or set in a specific direction, or the illumination distance to be extended. As such, the degree of freedom of the illumination range (including the illumination direction) and the illumination distance can be increased.

The rear-portion light emitting unit 123 is disposed inside the rear combination light 197 and serves as a light source for a brake light and a position light.

The first light guide 124 and the second light guide 126 are each formed of an optical fiber that can be bent freely depending on the shape of a routing space inside the vehicle body.

The lighting apparatus 120 described above constitutes a headlight apparatus that assists the in-light front-portion light emitting unit 122A of the headlight 191 using the front-portion upper-portion light emitting unit 122B, specifically, an auxiliary headlight.

The first light guide 124 includes a light first light guide 124A and an upper-portion first light guide 124B. The light first light guide 124A is connected with the in-light front-portion light emitting unit 122A. The upper-portion first light guide 124B branches midway from the light first light guide 124A to be connected with the front-portion upper-portion light emitting unit 122B.

The light source unit 11 is disposed, in the vehicle fore-aft direction, in a zone A2 between the head pipe 141 and the pivot shaft 162 (specifically, between a straight line 202 that overlaps an axis 141a passing through a center of the head pipe 141 and a vertical line 203 that passes through a center of the pivot shaft 162). The light source unit 11 may overlap the head pipe 141 or the pivot shaft 162 in a side view. This allows the light source unit 11 to be disposed closer to the center of gravity of the vehicle, so that centralization of mass on the side of the center of gravity of the vehicle body can be promoted. The axis 141a of the head pipe 141 serves as a steering axis of the front wheel 132. More specifically, the axis 141a of the head pipe 141 assumes a steering axis of the front fork 151 by which the front wheel 132 is supported, so that the front wheel 132 is steered about the axis 141a.

Additionally, the light source unit 11 is disposed, in the vehicle fore-aft direction, in a zone A3 between the power unit 161 (specifically, the engine 164) and the fuel tank 171. This arrangement also promotes centralization of mass on the side of the center of gravity of the vehicle body.

Additionally, a heat sink 18A (specifically, a plurality of cooling fins 18c) of the light source unit 11 is exposed to the outside from a clearance 205 provided between the seat 134 and the body cover 184. The cooling fins 18c each have a distal end disposed to be flush with or inside (or outside) in the vehicle width direction a plane connecting an outer lateral surface of the seat 134 and an outer lateral surface of the body cover 184.

Although the light source unit 11 can be cooled by the heat sink 18A, a coolant pipe extending from the cylinder portion 166 or the radiator 172 disposed around the light source unit 11 may be connected with the light source unit 11. This arrangement allows the light source unit 11 to be cooled by the coolant cooled by the radiator 172.

A certain type of power unit of the scooter motorcycle is oscillatably supported on the rear frames 143 of the vehicle body frame 131 via a pivot shaft. Specifically, the power unit has an upper portion supported on the rear frames 143 via the pivot shaft. With such a power unit, too, the light source unit 11 is disposed between the head pipe 141 and the pivot shaft. Alternatively, the light source unit 11 may be disposed between the power unit and the fuel tank 171.

A pair of left and right camera units 91 is disposed in the front cover 181 disposed inferior to the headlight 191.

Figure 7:
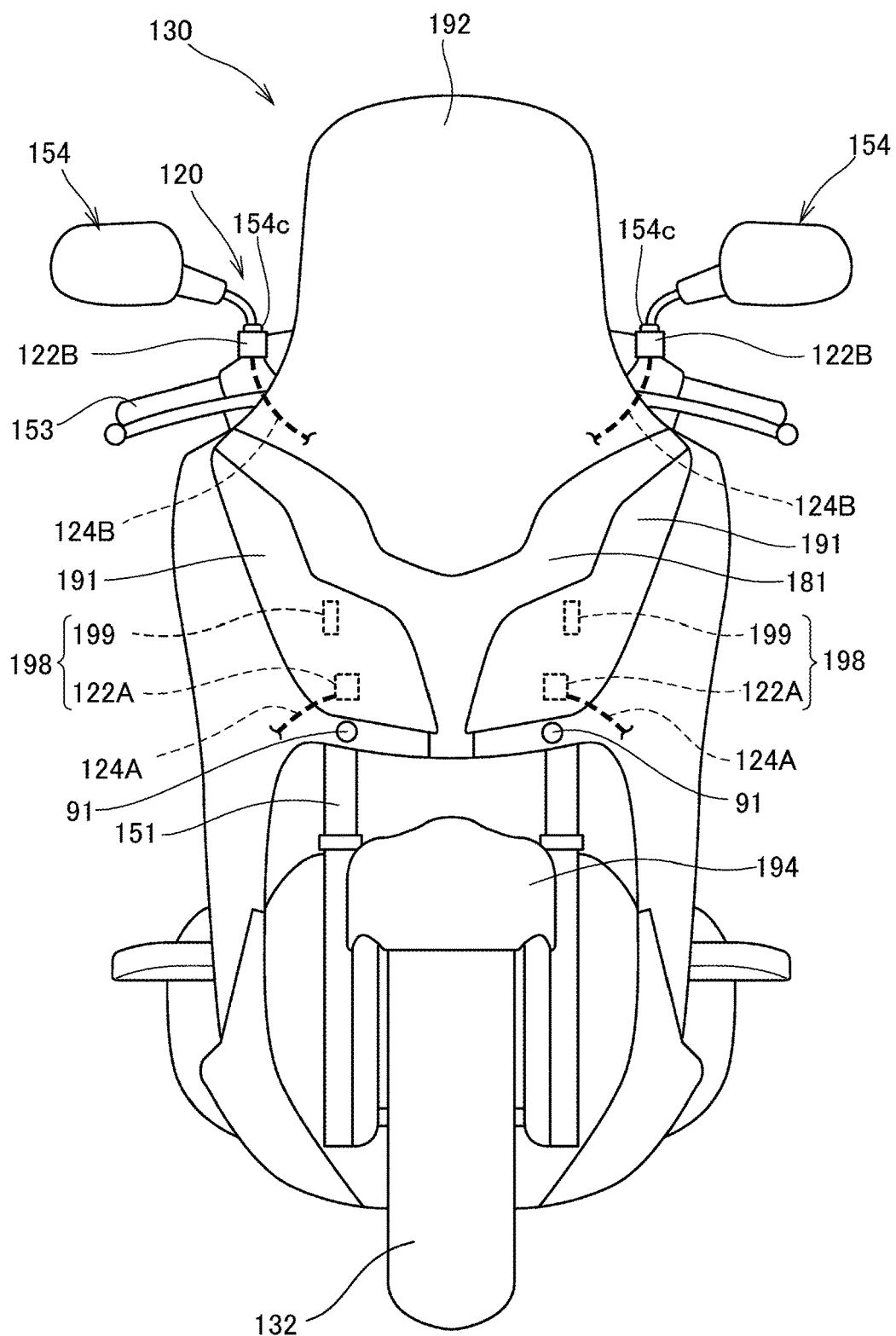
FIG. 7 is a front elevational view of the motorcycle depicting part of the lighting apparatus (third embodiment).
Figure 8:
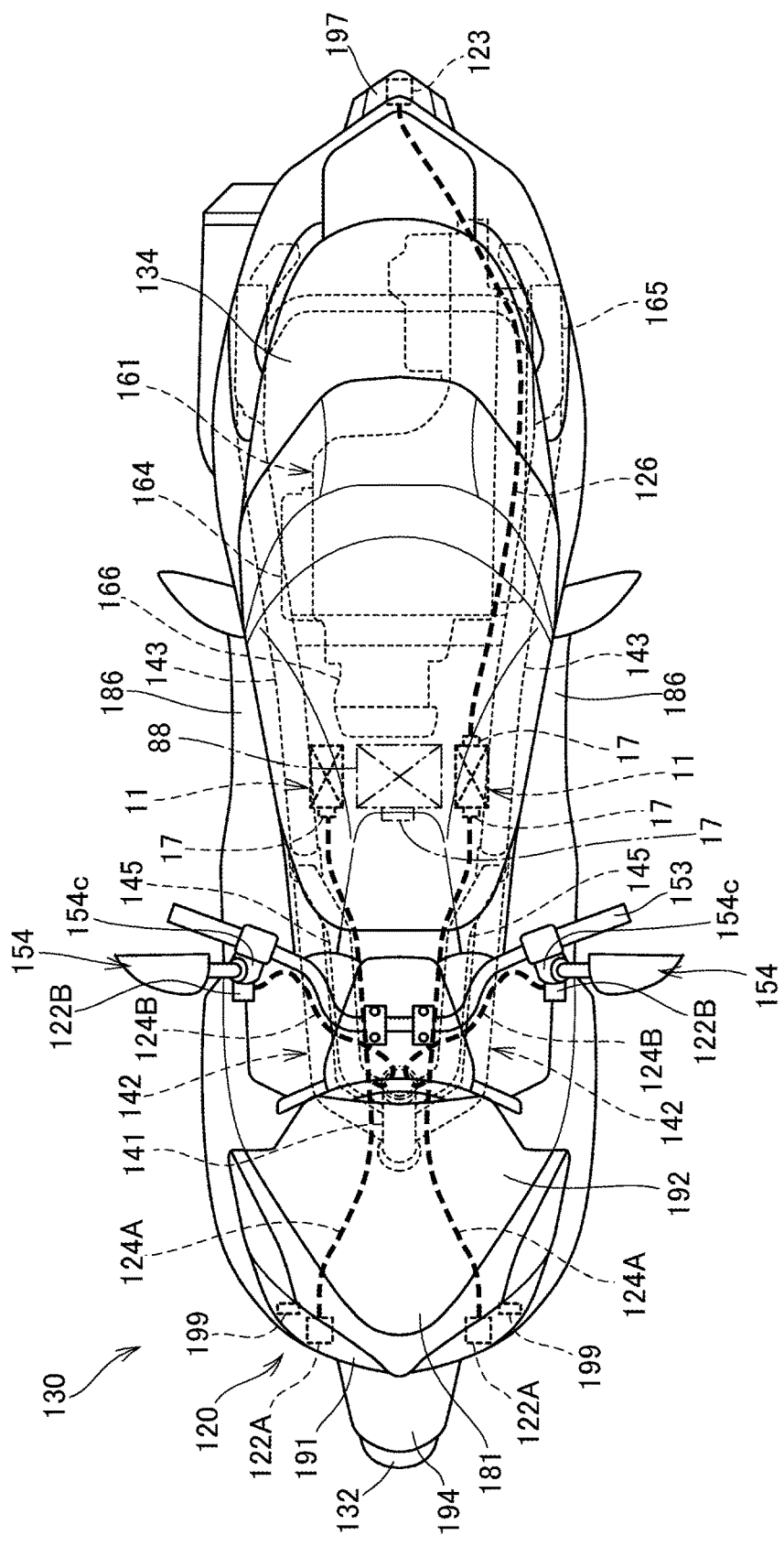
FIG. 8 is a plan view of the motorcycle depicting the lighting apparatus (third embodiment).

FIG. 7 is a front elevational view of the motorcycle 130 depicting part of the lighting apparatus 120. FIG. 8 is a plan view of the motorcycle 130 depicting the lighting apparatus 120.

As depicted in FIGS. 7 and 8 (and also FIG. 6), the light source unit 11 is provided in pairs, disposed inside the left and right rear frames 143 in the vehicle width direction.

The light first light guides 124A extend from respective laser devices 17 toward the front side along inner lateral surfaces of the respective down frames 142 (specifically, the upper down frames 145). The light first light guides 124A pass alongside the head pipe 141 and extend further into the front cover 181 before being connected with the respective in-light front-portion light emitting units 122A inside the headlight 191.

The upper-portion first light guides 124B bend upwardly in the middle of the light first light guides 124A (specifically, at a position posterior to the head pipe 141). The upper-portion first light guides 124B extend upwardly along the steering stem 152 (see FIG. 6) and extend further along the handlebar 153 toward the outside in the vehicle width direction before being connected with the respective front-portion upper-portion light emitting units 122B disposed at the base portions 154c of the respective rearview mirrors 154.

The front-portion upper-portion light emitting units 122B are disposed at high-level positions in the vehicle in a vehicle front view. Thus, nothing blocks the laser light emitted to the front of the vehicle from the front-portion upper-portion light emitting units 122B and the rearview mirrors 154 are suitable for the positions at which front-portion upper-portion light emitting units 122B are to be disposed.

The second light guide 126 extends from the laser device 17 of one of the light source units 11 toward the rear along the rear frame 143 on the second side (left side). The second light guide 126 extends from a rear end portion of the rear frame 143 into the rear combination light 197 and is connected with the rear-portion light emitting unit 123 of the rear combination light 197.

In the third embodiment, the light source unit 11 is provided in pairs on the left and right sides. As a modification, a single light source unit 88 indicated by the imaginary line in FIG. 8 may be disposed at a central portion in the vehicle width direction between the left and right rear frames 143.

The left and right camera units 91 are disposed, in the front cover 181, inferior to the respective left and right headlights 191. By providing the pair of left and right camera units 91, the distance to an imaging object, such as a pedestrian, a preceding vehicle, and an oncoming vehicle, can be obtained by the image processors of the respective camera units 91. This enables imaging object recognition accuracy to be enhanced and the beam to be swiftly changed over between the high beam and the low beam.

It is noted that the left and right camera units 91 may be disposed superior to the headlights 191 in the front cover 181.

As depicted in FIGS. 6 to 8, the front-portion upper-portion light emitting unit 122B as a light emitting unit is disposed at the base of the rearview mirror 154, specifically, at the base portion 154c of the rearview mirror 154. This configuration achieves strength of the rearview mirror 154, so that the front-portion upper-portion light emitting unit 122B can be readily protected.

As depicted in FIGS. 2 and 7, the camera unit 91 is disposed in the front cowl 62 or the front cover 181. This allows the camera unit 91 to be readily disposed on the front surface of the vehicle body and to be disposed at a relatively high-level position of the vehicle body, so that a distant image can be captured.

Fourth Embodiment

Figure 9:
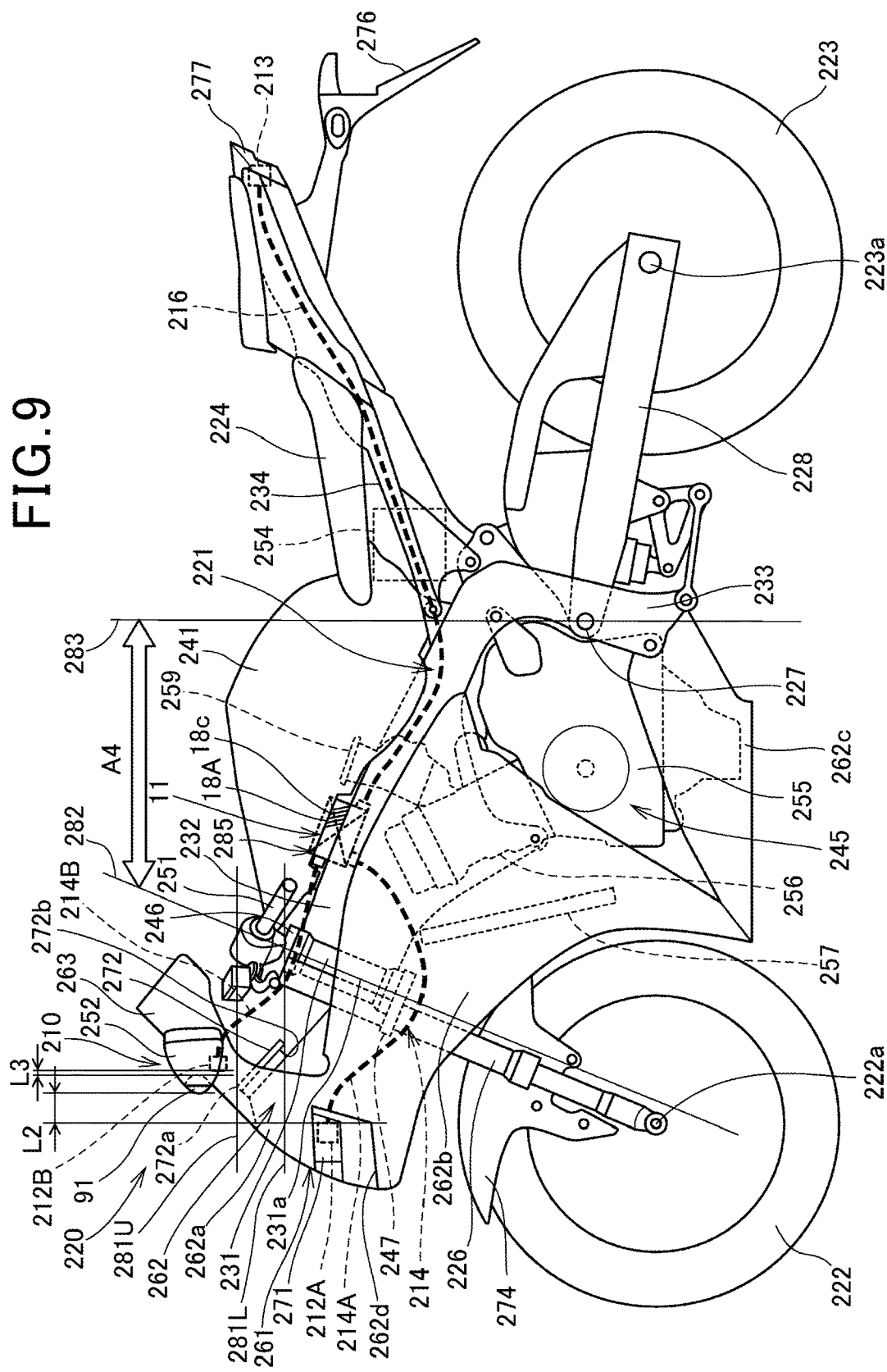
FIG. 9 is a left side elevational view of a motorcycle including a lighting apparatus according to a fourth embodiment of the present invention.

FIG. 9 is a left side elevational view of a motorcycle 220 including a lighting apparatus 210 according to a fourth embodiment of the present invention.

The motorcycle 220 is a super-sport saddle riding vehicle including a vehicle body frame 221, a front wheel 222, a rear wheel 223, and a seat 224.

The vehicle body frame 221 includes a head pipe 231, a pair of left and right main frames 232, a pair of left and right pivot frames 233, and a pair of left and right seat frames 234.

The head pipe 231 constitutes a front end portion of the vehicle body frame 221. The head pipe 231 steerably supports a front fork 226 that supports the front wheel 222. The main frames 232 extend from the head pipe 231 obliquely downwardly toward the rear. The main frames 232 support an engine 245. A fuel tank 241 is supported on upper portions of the main frames 232. The pivot frames 233 extend downwardly from rear end portions of the main frames 232. The pivot frames 233 support a pivot shaft 227 that extends in the vehicle width direction. The pivot frames 233 cooperate with the main frames 232 to support the engine 245. The seat frames 234 extend from rear end portions of the main frames 232 and upper end portions of the pivot frames 233 obliquely upwardly toward the rear. The seat frames 234 support the seat 224.

The front fork 226 includes a top bridge 246 and a bottom bridge 247 that each laterally connect the front fork 226. A pair of left and right handlebars 251 is mounted on an upper surface of the top bridge 246. The front wheel 222 is supported at a lower end portion of the front fork 226 via an axle 222a.

A swing arm 228 is swingably mounted on the pivot shaft 227. The rear wheel 223 is supported at a rear end portion of the swing arm 228 via an axle 223a.

A battery 254 is disposed posterior to the fuel tank 241 and inferior to the seat 224.

The engine 245 includes a crankcase 255 and a cylinder portion 256. The cylinder portion 256 extends from a front portion of the crankcase 255 obliquely upwardly toward the front. A radiator 257 is disposed anterior to the cylinder portion 256. The radiator 257 cools the engine 245 by water.

An intake system 259 including an air cleaner is connected with a rear portion of the cylinder portion 256.

The vehicle body frame 221 is covered with a vehicle body cover 261.

The vehicle body cover 261 includes a cowl 262. The cowl 262 includes an upper cowl 262a, a middle cowl 262b, and a lower cowl 262c. The upper cowl 262a covers the head pipe 231 and an upper portion of the front fork 226. The middle cowl 262b extends from the upper cowl 262a toward the rear to thereby laterally cover the cylinder portion 256 of the engine 245. The lower cowl 262c laterally covers a lower portion of the engine 245.

A headlight 271 is disposed inside the upper cowl 262a.

Additionally, the upper cowl 262a has a duct 262d formed therein at a central portion in the vehicle width direction of a front surface of the upper cowl 262a. The duct 262d allows air to flow into an inside of the upper cowl 262a. The headlight 271 is disposed at an upper edge of the duct 262d. To state the foregoing differently, the headlight 271 is disposed inside the duct 262d.

A windscreen 263 and a pair of left and right rearview mirrors 252 are mounted on an upper portion of the upper cowl 262a. A meter unit 272 is disposed at the upper portion of the upper cowl 262a and posterior to the windscreen 263.

A front fender 274 covers the front wheel 222 from above. A rear fender 276 covers the rear wheel 223 from above. A taillight 277 is disposed superior to the rear fender 276.

The lighting apparatus 210 includes a light source unit 11, an in-light front-portion light emitting unit 212A, a front-portion upper-portion light emitting unit 212B, a rear-portion light emitting unit 213, a first light guide 214, a second light guide 216, and the headlight 271. The headlight 271 forms part of the lighting apparatus 210.

The light source unit 11 is disposed on a lateral inside of each of the left and right main frames 232.

The in-light front-portion light emitting unit 212A assumes a headlight light source for the headlight 271. The headlight light source includes a low-beam light source and a high-beam light source.

The front-portion upper-portion light emitting unit 212B is added for supplementarily supporting the in-light front-portion light emitting unit 212A of the headlight 271 and functions as a high-beam light source. The front-portion upper-portion light emitting unit 212B is disposed at the rearview mirror 252, specifically, a base portion 252c at the base of the rearview mirror 252 (see FIG. 10). As a result, the front-portion upper-portion light emitting unit 212B is disposed on a level identical to a level on which the meter unit 272 is disposed or superior to the meter unit 272. For an easier understanding of the level of the front-portion upper-portion light emitting unit 212B, FIG. 9 depicts a horizontal auxiliary line 281U and a horizontal auxiliary line 281L. The auxiliary line 281U passes through an upper end 272a of the meter unit 272. The auxiliary line 281L passes through a lower end 272b of the meter unit 272. The front-portion upper-portion light emitting unit 212B is disposed superior to the lower auxiliary line 281L and, preferably, disposed superior to the upper auxiliary line 281U. The disposition of the front-portion upper-portion light emitting unit 212B at a high level of the vehicle body as described above allows an illumination range and an illumination distance of laser light to be emitted from the front-portion upper-portion light emitting unit 212B to be achieved.

The rear-portion light emitting unit 213 is disposed inside the taillight 277 and serves as a light source for a brake light and a position light.

The first light guide 214 and the second light guide 216 are each formed of an optical fiber that can be bent freely depending on the shape of a routing space inside the vehicle body.

The first light guide 214 includes a light first light guide 214A and an upper-portion first light guide 214B. The light first light guide 214A is connected with the in-light front-portion light emitting unit 212A. The upper-portion first light guide 214B is connected with the front-portion upper-portion light emitting unit 212B.

The light source unit 11 is disposed, in the vehicle fore-aft direction, in a zone A4 between the head pipe 231 and the pivot shaft 227 (specifically, between a straight line 282 that overlaps an axis 231a that passes through a center of the head pipe 231 and a vertical line 283 that passes through a center of the pivot shaft 227). The light source unit 11 may overlap the head pipe 231 or the pivot shaft 227 in a side view. This allows the light source unit 11 to be disposed closer to the center of gravity of the vehicle, so that centralization of mass on the side of the center of gravity of the vehicle body can be promoted. The axis 231a of the head pipe 231 serves as a steering axis of the front wheel 222. More specifically, the axis 231a of the head pipe 231 assumes a steering axis of the front fork 226 by which the front wheel 222 is supported, so that the front wheel 222 is steered about the axis 231a.

Additionally, the light source unit 11 is disposed between the engine 245 and the fuel tank 241. This arrangement also promotes centralization of mass on the side of the center of gravity of the vehicle body.

Additionally, a heat sink 18A (specifically, a plurality of cooling fins 18c) of the light source unit 11 is exposed to the outside from a clearance 285 provided between the main frames 232 and the fuel tank 241. The cooling fins 18c each have a distal end disposed to be flush with or inside (or outside) in the vehicle width direction a plane connecting an outer lateral surface of the main frames 232 and an outer lateral surface of the fuel tank 241.

Although the light source unit 11 can be cooled by the heat sink 18A, a coolant pipe extending from the cylinder portion 256 or the radiator 257 disposed around the light source unit 11 may be connected with the light source unit 11. This arrangement allows the light source unit 11 to be cooled by the coolant cooled by the radiator 257.

The lighting apparatus 210 described above constitutes a headlight apparatus that includes the headlight 271 and the front-portion upper-portion light emitting unit 212B that supplementarily assists the high-beam light source of the in-light front-portion light emitting unit 212A as a headlight light source for the headlight 271.

A camera unit 91 is disposed at a front surface of each of the left and right rearview mirrors 252.

Let L2 denote a distance in the fore-aft direction between the in-light front-portion light emitting unit 212A and the camera unit 91 and let L3 denote a distance in the fore-aft direction between the front-portion upper-portion light emitting unit 212B and the camera unit 91.

Figure 10:
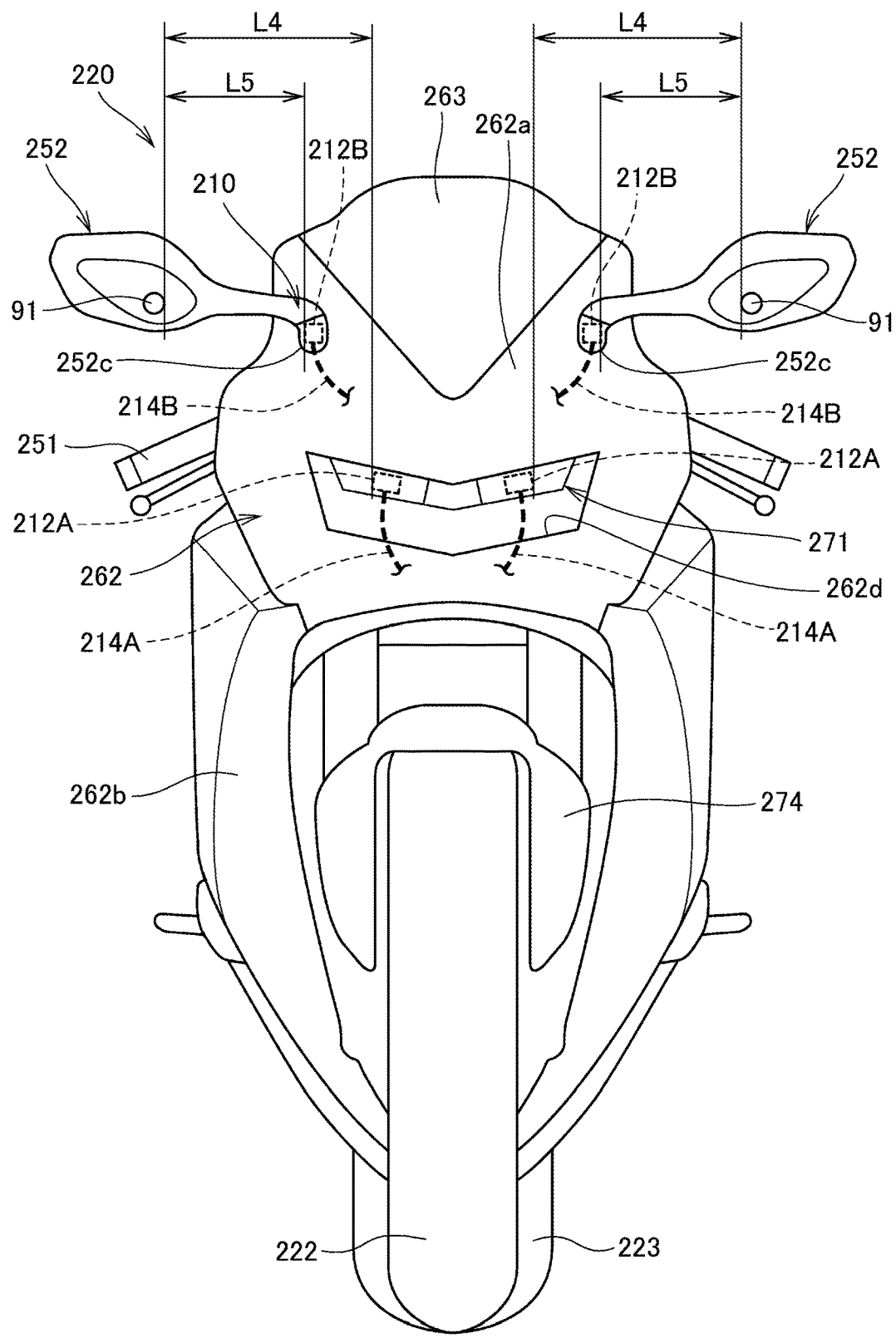
FIG. 10 is a front elevational view of the motorcycle depicting part of the lighting apparatus (fourth embodiment).
Figure 11:
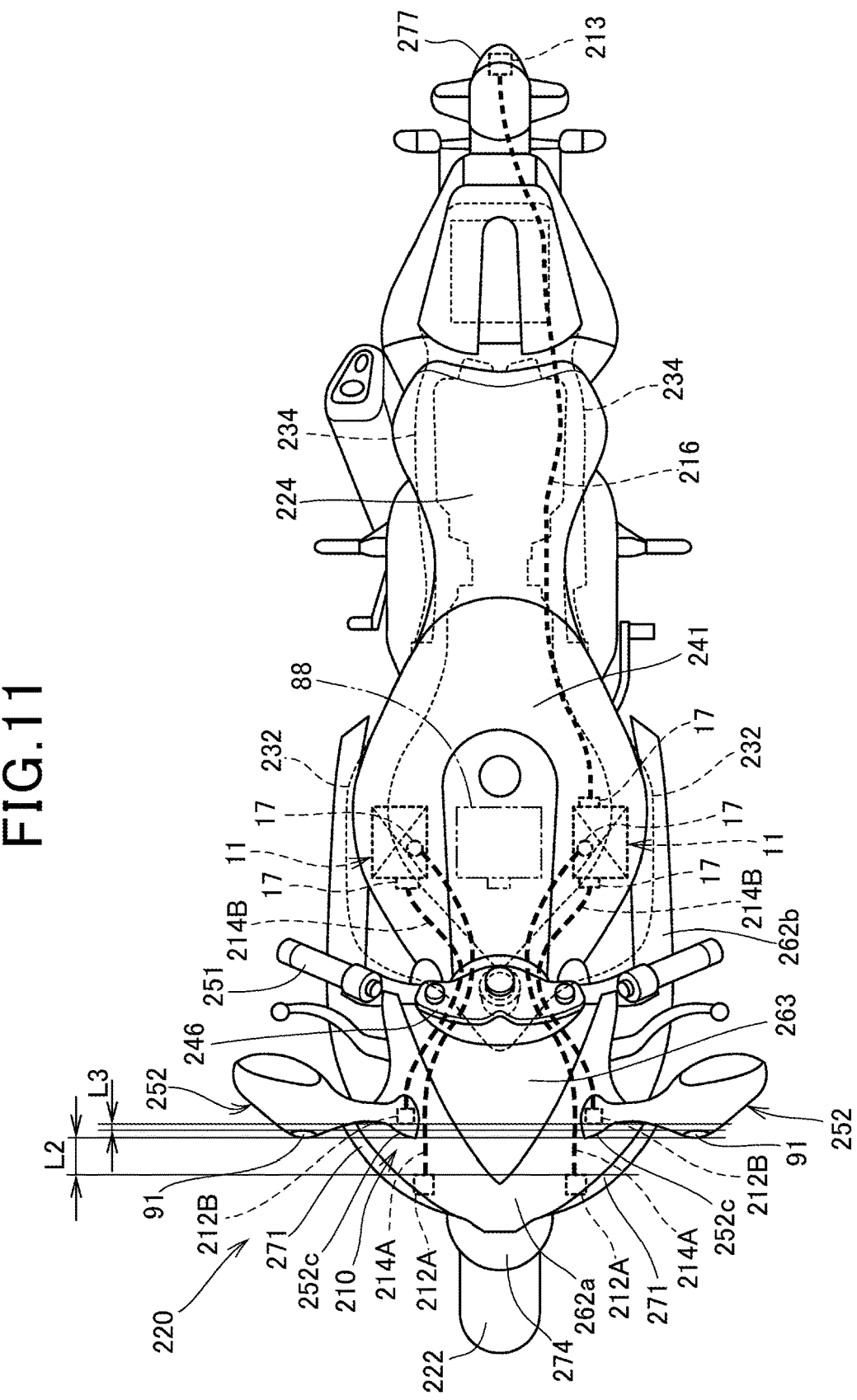
FIG. 11 is a plan view of the motorcycle depicting the lighting apparatus (fourth embodiment).

FIG. 10 is a front elevational view of the motorcycle 220 depicting part of the lighting apparatus 210. FIG. 11 is a plan view of the motorcycle 220 depicting the lighting apparatus 210.

As depicted in FIG. 10, the in-light front-portion light emitting units 212A of the lighting apparatus 210 are incorporated in the headlight 271. This arrangement allows the headlight 271 to be formed into what is called a "narrow-eye" shape that is compact in size and has a small vertical width, giving a novel impression. Additionally, building the compact and thin-wall headlight 271 as described above allows the in-light front-portion light emitting unit 212A to be disposed inside the duct 262d that offers only a narrow space, so that a vehicle body space can be effectively utilized. The disposition of the in-light front-portion light emitting unit 212A of the headlight 271 inside the duct 262d allows heat generated in the in-light front-portion light emitting unit 212A to be radiated to air flow drawn into the duct 262d, so that the in-light front-portion light emitting unit 212A can be cooled.

As depicted in FIGS. 10 and 11 (and also FIG. 9), the light source unit 11 is provided in pairs, disposed inside the left and right main frames 232 in the vehicle width direction.

The light first light guides 214A extend from respective laser devices 17 toward the front side along inner lateral surfaces of the respective main frames 232. The light first light guides 214A extend paths inferior to the head pipe 231 (see FIG. 9) and further extend into the middle cowl 262b and the upper cowl 262a before being connected with the respective in-light front-portion light emitting units 212A inside the headlight 271.

The upper-portion first light guides 214B extend toward the front side from the respective laser devices 17 along upper edges of the respective main frames 232 and are connected, by way of the upper cowl 262a, with the respective front-portion upper-portion light emitting units 212B at the base portions 252c of the respective rearview mirrors 252.

The front-portion upper-portion light emitting units 212B are disposed at high-level positions in the vehicle in a vehicle front view. Thus, nothing blocks the laser light emitted to the front of the vehicle from the front-portion upper-portion light emitting units 212B and the rearview mirrors 252 are suitable for the positions at which front-portion upper-portion light emitting units 212B are to be disposed.

The second light guide 216 extends from the laser device 17 of one of the light source units 11 toward the rear along the seat frame 234 on the second side (left side). The second light guide 216 extends from a rear end portion of the seat frame 234 into the taillight 277 and is connected with the rear-portion light emitting unit 213 of the taillight 277.

The left and right camera units 91 are disposed outside in the vehicle width direction portions that protrude most to the outside in the vehicle width direction of the cowl 262 (specifically, the middle cowl 262b). This arrangement allows a situation ahead of the vehicle covering a wider range to be imaged, so that a greater amount of information can be quickly recognized.

Let L4 denote a distance in the vehicle width direction between the in-light front-portion light emitting unit 212A and the camera unit 91 and let L5 denote a distance in the vehicle width direction between the front-portion upper-portion light emitting unit 212B and the camera unit 91. Reference is made to FIGS. 9 and 10. In the fore-aft direction, the distance L2 between the in-light front-portion light emitting unit 212A and the camera unit 91 and the distance L3 between the front-portion upper-portion light emitting unit 212B and the camera unit 91 are both short. In the vehicle width direction, however, the distance L4 between the in-light front-portion light emitting unit 212A and the camera unit 91 and the distance L5 between the front-portion upper-portion light emitting unit 212B and the camera unit 91 are both equal to or longer than predetermined distances. This arrangement can prevent heat generated in the in-light front-portion light emitting unit 212A and the front-portion upper-portion light emitting unit 212B from affecting the camera unit 91.

In the fourth embodiment, the light source unit 11 is provided in pairs on the left and right sides. As a modification, a single light source unit 88 indicated by the imaginary line in FIG. 11 may be disposed at a central portion in the vehicle width direction between the left and right main frames 232.

Fifth Embodiment

Figure 12:
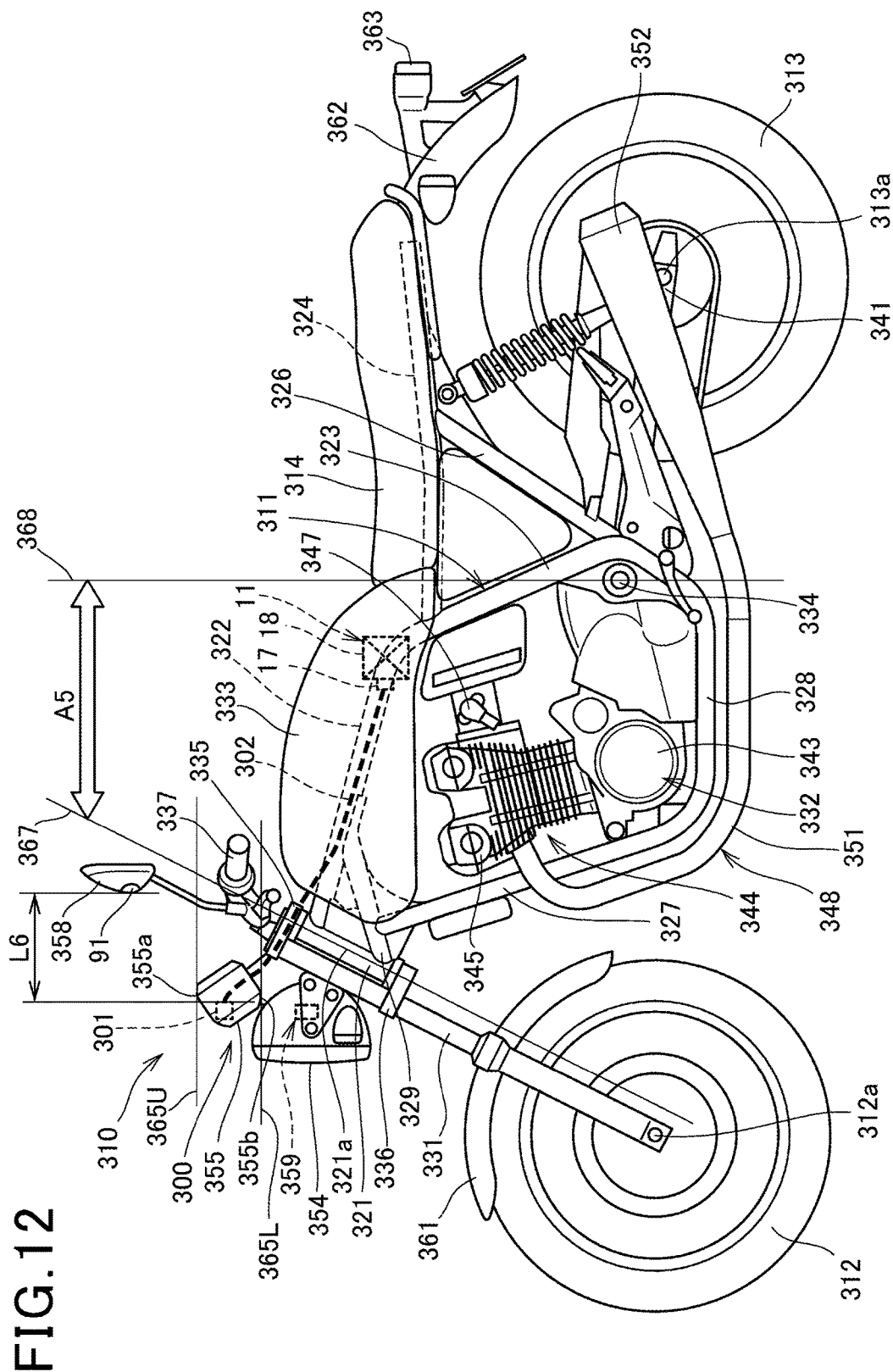
FIG. 12 is a left side elevational view of a motorcycle including a lighting apparatus according to a fifth embodiment of the present invention.
Figure 13:
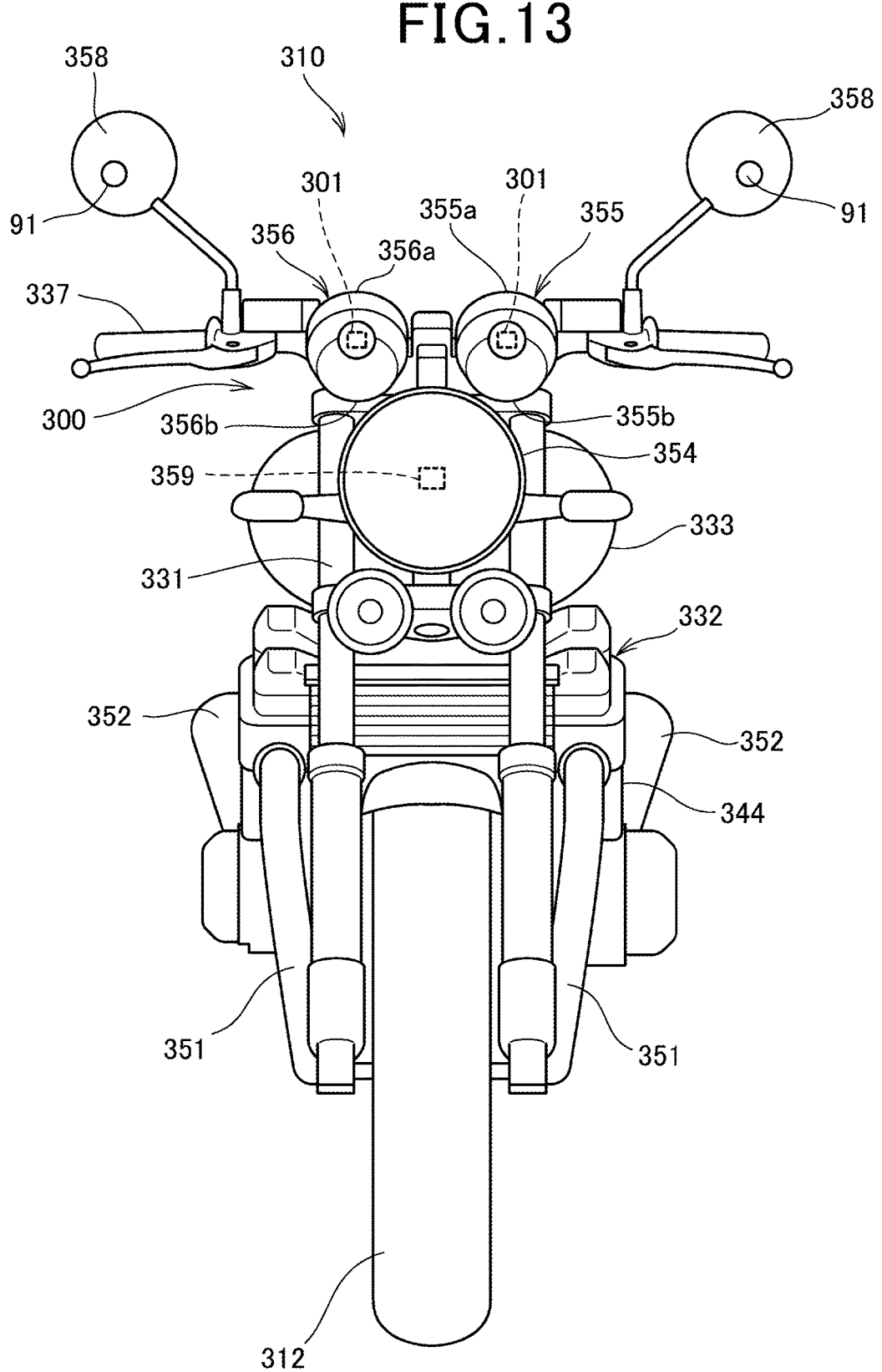
FIG. 13 is a front elevational view of the motorcycle depicting part of the lighting apparatus (fifth embodiment).

FIG. 12 is a left side elevational view of a motorcycle 310 including a lighting apparatus 300 according to a fifth embodiment of the present invention. FIG. 13 is a front elevational view of the motorcycle 310 depicting part of the lighting apparatus 300 (fifth embodiment).

As depicted in FIGS. 12 and 13, the motorcycle 310 is a naked saddle riding vehicle including a vehicle body frame 311, a front wheel 312, a rear wheel 313, and a seat 314.

The vehicle body frame 311 includes a head pipe 321, a pair of left and right main frames 322, a pair of left and right pivot frames 323, a pair of left and right seat frames 324, a pair of left and right sub-frames 326, a pair of left and right down frames 327, a pair of left and right lower frames 328, and a reinforcement frame 329.

The head pipe 321 constitutes a front end portion of the vehicle body frame 311. The head pipe 321 steerably supports a front fork 331 that supports the front wheel 312. The main frames 322 extend from the head pipe 321 obliquely downwardly toward the rear. The main frames 322 support an engine 332. A fuel tank 333 is supported on upper portions of the main frames 322. The pivot frames 323 extend downwardly from rear end portions of the main frames 322. The pivot frames 323 support a pivot shaft 334 that extends in the vehicle width direction. The seat frames 324 extend from upper end portions of the pivot frames 323 toward the rear. The seat frames 324 support the seat 314.

The sub-frames 326 connect the pivot frames 323 with the seat frames 324. The down frames 327 extend from a pair of left and right reinforcement frames 329 disposed across the head pipe 321 and the left and right main frames 322 obliquely downwardly toward the rear. Additionally, the down frames 327 cooperate with the pivot frames 323 to support the engine 332. The lower frames 328 extend from lower end portions of the down frames 327 toward the rear and have rear end portions connected with the pivot frames 323.

The front fork 331 includes a top bridge 335 and a bottom bridge 336 that each laterally connect the front fork 331. A handlebar 337 is mounted on an upper surface of the top bridge 335. The front wheel 312 is supported at a lower end portion of the front fork 331 via an axle 312a.

A swing arm 341 is swingably mounted on the pivot shaft 334. The rear wheel 313 is supported at a rear end portion of the swing arm 341 via an axle 313a.

The engine 332 includes a crankcase 343 and a cylinder portion 344. The cylinder portion 344 extends from a front portion of the crankcase 343 obliquely upwardly toward the front. The cylinder portion 344 includes a cylinder head 345. An intake system 347 including an air cleaner is connected with a rear portion of the cylinder head 345. An exhaust system 348 is connected with a front portion of the cylinder head 345. The exhaust system 348 includes a plurality of exhaust pipes 351 and a muffler 352. The exhaust pipes 351 are connected with the cylinder head 345. The muffler 352 is connected with rear end portions of the exhaust pipes 351.

A headlight 354 and a pair of left and right meter units 355 and 356 (FIG. 12 depicts only the meter unit 355 closer to the viewer of FIG. 12) disposed superior to the headlight 354 are disposed on the front fork 331. A pair of left and right rearview mirrors 358 is mounted on the handlebar 337.

The headlight 354 includes a headlight light source 359 including an electric bulb or an LED. The headlight light source 359 includes a low-beam light source and a high-beam light source.

A front fender 361 covers the front wheel 312 from above. A rear fender 362 covers the rear wheel 313 from above. A taillight 363 is disposed posterior to the rear fender 362.

The lighting apparatus 300 includes a pair of left and right light source units 11, a pair of left and right light emitting units 301 (FIG. 12 depicts only the light emitting unit 301 closer to the viewer of FIG. 12), and a pair of left and right light guides 302.

The light source units 11 are disposed inside in the vehicle width direction the left and right main frames 322 (FIG. 12 depicts only the main frame 322 closer to the viewer of FIG. 12). The light source units 11 are disposed superior to the intake system 347.

The pair of left and right light source units 11 is illustrative only and not limiting. For example, a single light source unit 11 may be disposed at a central portion in the vehicle width direction between the left and right main frames 322.

The light source unit 11 is disposed, in the vehicle fore-aft direction, in a zone A5 between the head pipe 321 and the pivot shaft 334 (specifically, between a straight line 367 that overlaps an axis 321a that passes through a center of the head pipe 321 and a vertical line 368 that passes through a center of the pivot shaft 334). The light source unit 11 may overlap the head pipe 321 or the pivot shaft 334 in a side view. This allows the light source unit 11 to be disposed closer to the center of gravity of the vehicle, so that centralization of mass on the side of the center of gravity of the vehicle body can be promoted. The axis 321a of the head pipe 321 serves as a steering axis of the front wheel 312. More specifically, the axis 321a of the head pipe 321 assumes a steering axis of the front fork 331 by which the front wheel 312 is supported, so that the front wheel 312 is steered about the axis 321a.

Additionally, the light source unit 11 is disposed between the engine 332 and the fuel tank 333. This arrangement also promotes centralization of mass on the side of the center of gravity of the vehicle body.

The light emitting unit 301 is a high-beam light source added for supplementarily supporting a high-beam light source of the headlight light source 359 of the headlight 354. The light emitting unit 301 is disposed at a front portion of each of the left and right meter units 355 and 356. The light emitting unit 301 is disposed between a horizontal auxiliary line 365U that passes through upper ends 355a and 356a of the meter units 355 and 356 and a horizontal auxiliary line 365L that passes through lower ends 355b and 356b of the meter units 355 and 356. As such, the light emitting units 301 are disposed at high-level positions in the vehicle body. Thus, nothing blocks the laser light emitted to the front of the vehicle from the light emitting units 301, so that an illumination range and an illumination distance of the laser light to be emitted from the light emitting units 301 can be readily achieved. Thus, the meter units 355 and 356 are suitable for the positions at which light emitting units 301 are to be disposed.

The light guides 302 are each formed of an optical fiber that can be bent freely depending on the shape of a routing space inside the vehicle body. The left and right light guides 302 extend from respective laser devices 17 toward the front side along inner lateral surfaces of the respective main frames 322. The left and right light guides 302 bend upwardly at positions posterior to the head pipe 321. The left and right light guides 302 then extend toward the front from the top bridge 335 of the front fork 331 before being connected with the respective light emitting units 301 in the respective meter units 355 and 356.

The lighting apparatus 300 described above constitutes a headlight apparatus including the light emitting unit 301 that supplementarily assists the high-beam light source of the headlight 354. It is noted that the headlight light source 359 of the headlight 354 may constitute only the low-beam light source. In this case, the lighting apparatus 300 is a headlight apparatus including the light emitting unit 301 having the function of only the high-beam light source of the headlight 354.

A camera unit 91 is disposed at a front surface of each of the left and right rearview mirrors 358.

The disposition of the camera units 91 at high-level positions of the vehicle body, specifically, the rearview mirrors 358 allows a situation farther ahead of the vehicle to be imaged, so that a pedestrian, a preceding vehicle, and an oncoming vehicle can be more readily recognized.

Additionally, the foregoing arrangement can achieve a predetermined distance or longer for a distance L6 in the fore-aft direction between the light emitting unit 301 and the camera unit 91 to thereby prevent heat generated in the light emitting unit 301 from affecting the camera unit 91.

As described above with reference to FIGS. 12 and 13, the light emitting unit 301 is disposed at each of the meter units 355 and 356. The light emitting units 301 can thus be mounted using existing wires and stays of the meter units 355 and 356. This achieves reduction in cost compared with an arrangement requiring new wires and stays.

As depicted in FIGS. 10 and 13, the camera units 91 are disposed at the rearview mirrors 252 and 358. The camera units 91, because being disposed at high-level positions in the vehicle body, can enhance sensing performance.

Figure 14:
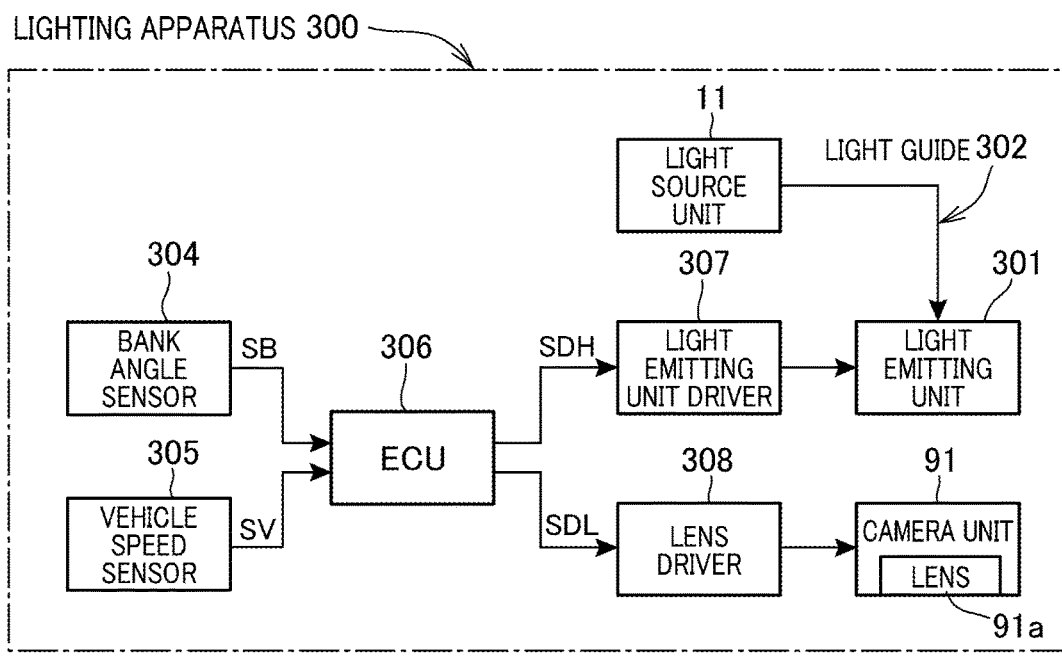
FIG. 14 is a block diagram of the lighting apparatus (fifth embodiment).

FIG. 14 is a block diagram of the lighting apparatus 300 (fifth embodiment).

The lighting apparatus 300 allows the illumination direction of the light emitting unit 301 that is connected with the light source unit 11 via the light guide 302 to be changed to, for example, a vehicle traveling direction. The lighting apparatus 300 can also direct a lens 91a of the camera unit 91 to, for example, the illumination direction of the light emitting unit 301.

Specifically, the lighting apparatus 300 includes the light source unit 11, the light emitting unit 301, the light guide 302, a bank angle sensor 304, a vehicle speed sensor 305, an electronic control unit (ECU) 306, a light emitting unit driver 307, a lens driver 308, and the camera unit 91.

The bank angle sensor 304 detects an angle (bank angle) at which the motorcycle 310 (see FIG. 13) is inclined to the left or right with respect to an upright position of the vehicle body of the motorcycle 310. The vehicle speed sensor 305 detects a vehicle speed of the motorcycle 310. A bank angle signal SB that represents a detection signal of the bank angle detected by the bank angle sensor 304 and a vehicle speed signal SV that represents a detection signal of the vehicle speed detected by the vehicle speed sensor 305 are output to the ECU 306.

The ECU 306 calculates and estimates the traveling direction of the motorcycle 310 using the bank angle signal SB and the vehicle speed signal SV. The ECU 306 then outputs a light emitting unit drive signal SDH and a lens drive signal SDL including the calculated traveling direction to the light emitting unit driver 307 and the lens driver 308, respectively.

The light emitting unit driver 307 drives the light emitting unit 301 using an electric motor, a solenoid, a pneumatic cylinder, a hydraulic cylinder, or other actuator on the basis of the light emitting unit drive signal SDH, to thereby direct the illumination direction of the light emitting unit 301 to the traveling direction of the motorcycle 310 or a direction inclined at a predetermined angle with respect to the traveling direction.

The lens driver 308 drives the lens 91a of the camera unit 91 using an electric motor, a solenoid, a pneumatic cylinder, a hydraulic cylinder, or other actuator on the basis of the lens drive signal SDL, to thereby direct the lens to the traveling direction of the motorcycle 310 or a direction inclined at a predetermined angle with respect to the traveling direction.

It is noted that, in addition driving the lens only, the camera unit 91 including the lens may also be generally driven to thereby direct the camera unit 91 toward the traveling direction of the motorcycle 310 or a direction inclined at a predetermined angle with respect to the traveling direction.

As described above, the traveling direction of the vehicle is estimated on the basis of at least the detection signal of the bank angle of the vehicle body, so that the illumination direction of the light emitting unit 301 can be changed toward the traveling direction and the lens 91a of the camera unit 91 can be directed toward the illumination direction. This enables the illumination direction of the light emitting unit 301 and the direction toward which the lens 91a is oriented to be adjusted at all times to the traveling direction even when the traveling direction of the vehicle changes, so that accurate sensing by the camera unit 91 can be performed.

Sixth Embodiment

Figure 15:
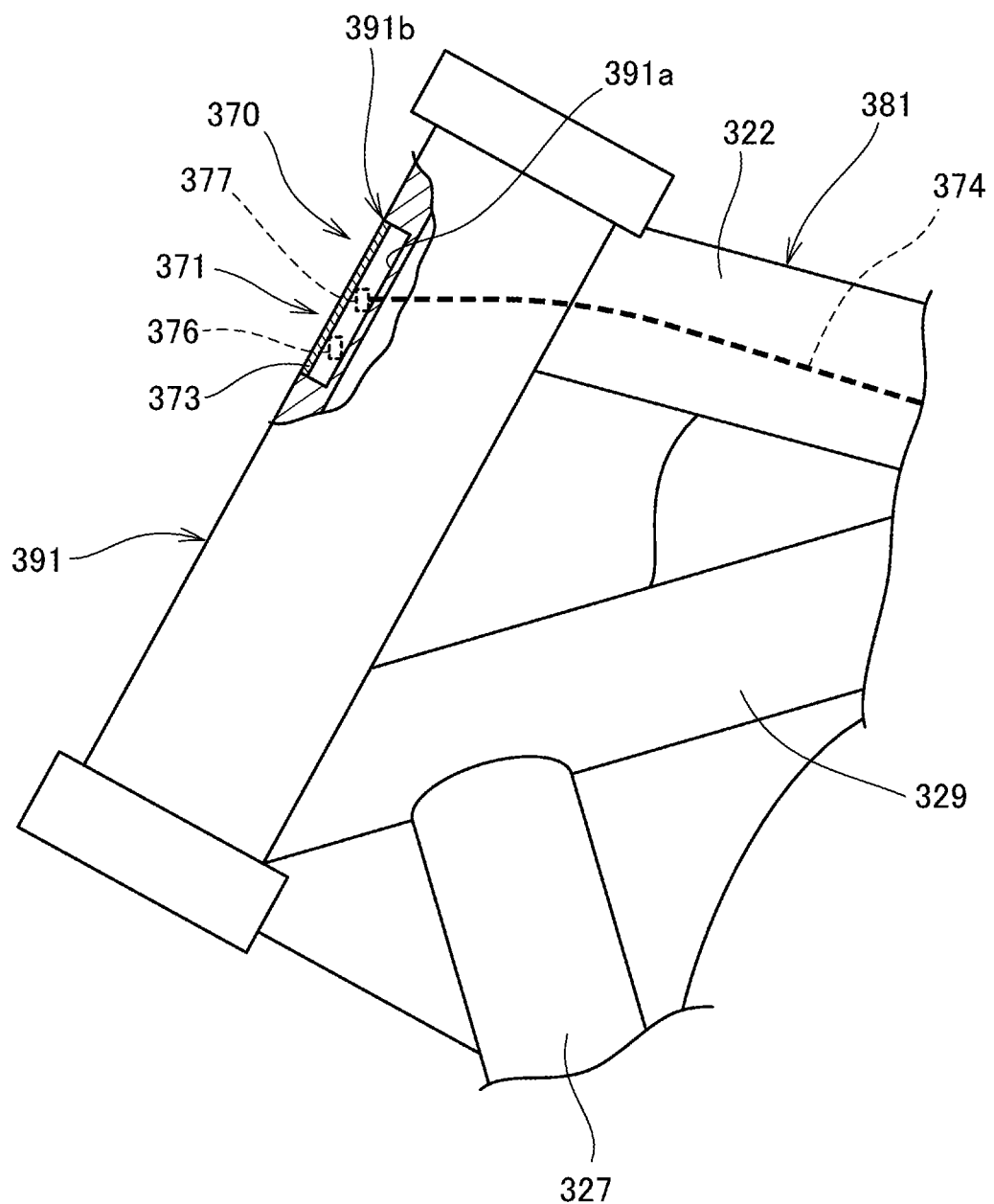
FIG. 15 is a left side elevational view of a vehicle body frame in which a lighting apparatus according to a sixth embodiment of the present invention is disposed.
Figure 16:
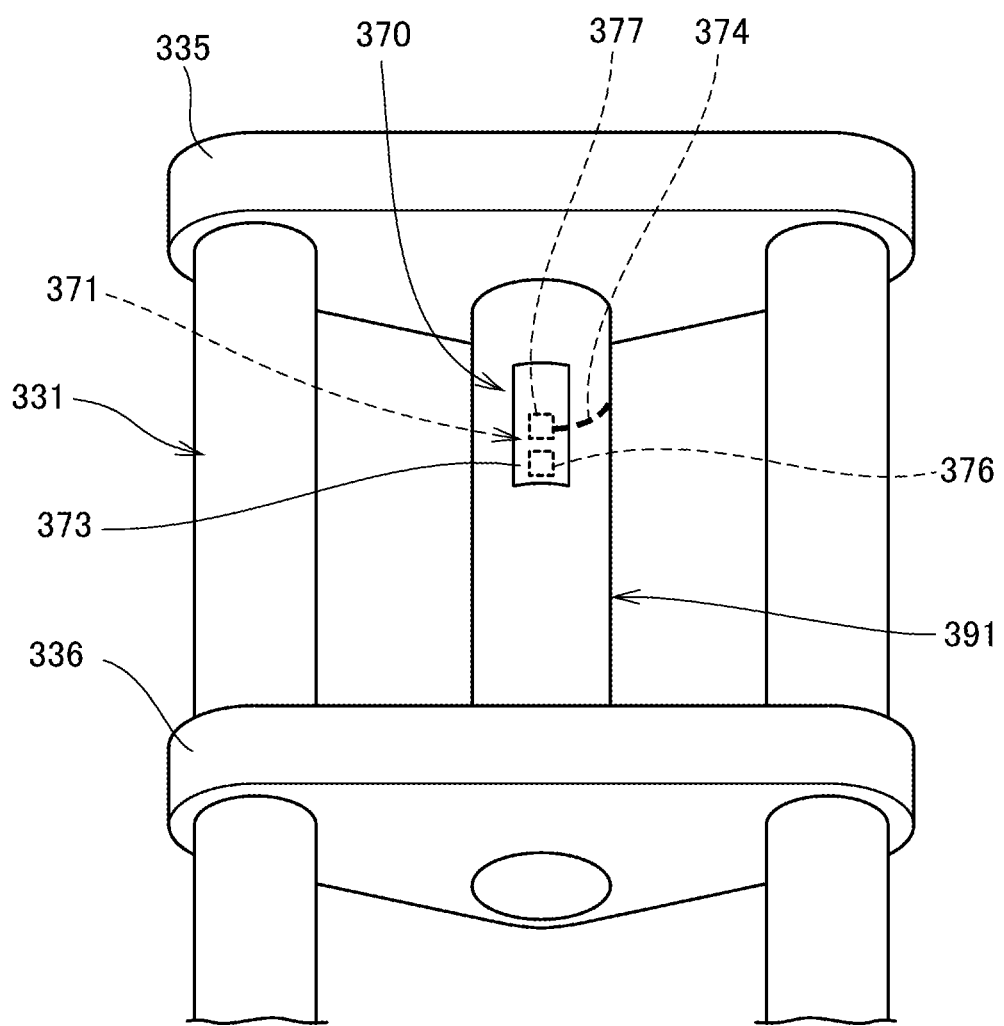
FIG. 16 is a front elevational view of a vehicle body front portion depicting an arrangement of the lighting apparatus (sixth embodiment).

FIG. 15 is a left side elevational view of a vehicle body frame 381 in which a lighting apparatus 370 according to a sixth embodiment of the present invention is disposed. FIG. 16 is a front elevational view of a vehicle body front portion depicting an arrangement of the lighting apparatus 370 (sixth embodiment).

In the sixth embodiment, like or corresponding parts are identified by the same reference symbols as those used for the fifth embodiment of the present invention and descriptions for those parts will be omitted.

As depicted in FIGS. 15 and 16, the lighting apparatus 370 includes a headlight light source 371, a recess 391a, a lens 373, a light source unit 11 (see FIG. 12), and a light guide 374. The recess 391a is formed in a front portion of a head pipe 391. The head pipe 391 forms part of the vehicle body frame 381. The lens 373 is disposed so as to close an opening 391b in the recess 391a.

The headlight light source 371 includes a low-beam light source 376 and a light emitting unit 377. The low-beam light source 376 is formed of an electric bulb or and LED. The light emitting unit 377 serves as a high-beam light source connected with a distal end of the light guide 374. The low-beam light source 376 and the light emitting unit 377 are disposed posterior to the lens 373 inside the recess 391a. A reflector (not depicted) that reflects light emitted by the low-beam light source 376 to the front is disposed posterior to the low-beam light source 376.

As described above, the lighting apparatus 370 is a headlight apparatus emitting laser light from the light emitting unit 377 as the high-beam light source.

The vehicle body frame 381 differs from the vehicle body frame 311 of the fifth embodiment depicted in FIG. 12 in the head pipe 391 only. The light source unit 11 is disposed at a location identical to the location at which the light source unit 11 of the fifth embodiment is disposed.

The disposition of the lighting apparatus 370 on the head pipe 391 contributes to a simple structure around a front fork 331 and gives a novel impression. Thus, merchandise attractiveness can be enhanced.

It is noted that the lighting apparatus 370 may be incorporated as part in a top bridge 335, a bottom bridge 336, or a front fork 331, instead of the head pipe 391.

It should be noted that the present invention is not limited to the above-described embodiments and may include various modifications without departing from the spirit or essential characteristics thereof.

The present invention is applicable to, not only the motorcycle, but also a saddle riding vehicle including any type of vehicle other than the motorcycle. It is noted that the saddle riding vehicle includes general types of vehicles that include vehicle bodies straddled by the operator, including three-wheeled vehicles and four-wheeled vehicles classified as all-terrain vehicles (ATVs), in addition to the motorcycles (including motor-assisted bicycles).

DESCRIPTION OF REFERENCE SYMBOLS 10, 100, 120, 210, 300: Lighting apparatus
12: Front-portion light emitting unit (light emitting unit)
14, 124, 214: First light guide (light guide)
16, 126, 216: Second light guide (light guide)
17: Laser device (laser light source)
20, 110, 130, 220: Motorcycle (saddle riding vehicle)
52, 154, 252, 358: Rearview mirror
62: Front cowl
71, 354: Headlight (lighting apparatus)
72, 193, 272, 355, 356: Meter unit
91: Camera unit
91a: Lens
104, 302: Light guide (light guide)
122A: In-light front-portion light emitting unit (light emitting unit)
122B: Front-portion upper-portion light emitting unit (light emitting unit)
181: Front cover
212A: In-light front-portion light emitting unit (light emitting unit)
212B: Front-portion upper-portion light emitting unit (light emitting unit)
301: Light emitting unit

The invention claimed is:
1. A saddle riding vehicle, comprising:
a lighting apparatus, wherein the lighting apparatus comprises:
a laser light source that emits light;
a light guide that guides light from the laser light source to any desired position;
at least one light emitting unit disposed at a distal end of the light guide, the light emitting unit irradiating areas around the vehicle with light from the light guide, and
a rearview mirror extending upward at a front portion of a vehicle body, wherein
the light emitting unit is disposed at a position higher in level than a lower end of a meter unit disposed at the front portion of the vehicle body,
is disposed in an upper portion of the rearview mirror, and
is able to irradiate areas forward of the vehicle.

2. The saddle riding vehicle according to claim 1, comprising:
another lighting apparatus including an electric bulb or an LED as a light source.

3. The saddle riding vehicle according to claim 1, comprising:
a camera unit that senses a situation ahead of the vehicle during nighttime traveling.

4. The saddle riding vehicle according to claim 3, wherein the camera unit is capable of magnifying images.

5. The saddle riding vehicle according to claim 3, wherein the camera unit detects visible light.

6. The saddle riding vehicle according to claim 3, wherein the camera unit is disposed in a front cowl or a front cover.

7. The saddle riding vehicle according to claim 3, wherein the camera unit is disposed in the rearview mirror.

8. The saddle riding vehicle according to claim 3, wherein an illumination direction of the light emitting unit can be changed toward a traveling direction of the vehicle that is estimated using at least a detection signal of a bank angle of the vehicle body, and
a lens of the camera unit can be directed toward the illumination direction.

\* \* \* \* \*